United States Patent
Yang et al.

(10) Patent No.: US 11,846,611 B2
(45) Date of Patent: Dec. 19, 2023

(54) IN SITU MECHANICAL CHARACTERIZATION OF A SINGLE CELL-CELL ADHESION INTERFACE UNDER LARGE STRAIN

(71) Applicants: NUTECH VENTURES, Lincoln, NE (US); UT-BATTELLE, LLC, Oak Ridge, TN (US)

(72) Inventors: Ruiguo Yang, Lincoln, NE (US); Nikolay V. Lavrik, Knoxville, TN (US); Amir Monemian Esfahani, Lincoln, NE (US); Jordan Daniel Rosenbohm, Lincoln, NE (US); Bahareh Tajvidi Safa, Lincoln, NE (US); Grayson Minnick, Lincoln, NE (US)

(73) Assignees: NUTECH VENTURES, Lincoln, NE (US); UT-BATTELLE, LLC, Oak Ridge, TN (US)

( * ) Notice: Subject to any disclaimer, the term of this patent is extended or adjusted under 35 U.S.C. 154(b) by 75 days.

(21) Appl. No.: 17/473,090

(22) Filed: Sep. 13, 2021

(65) Prior Publication Data
US 2022/0082483 A1    Mar. 17, 2022

Related U.S. Application Data

(60) Provisional application No. 63/077,264, filed on Sep. 11, 2020.

(51) Int. Cl.
*G01N 3/08*    (2006.01)
*G01Q 60/26*   (2010.01)
(Continued)

(52) U.S. Cl.
CPC ............. *G01N 3/08* (2013.01); *G01N 3/06* (2013.01); *G01N 19/04* (2013.01); *G01Q 60/26* (2013.01);
(Continued)

(58) Field of Classification Search
CPC .... G01N 3/08; G01N 3/06; G01N 2203/0089; G01N 2203/0286; G01N 19/04; G01Q 60/28; G01Q 60/26
See application file for complete search history.

(56) References Cited

U.S. PATENT DOCUMENTS 7,752,916 B2 *  7/2010  Han .................. G01N 3/04
                                            73/789
8,499,645 B2 *  8/2013  Chasiotis ............. D02G 3/22
                                            73/831

(Continued)

OTHER PUBLICATIONS

Ahmadzadeh et al., Viscoelasticity of Tau Proteins Leads to Strain Rate-Dependent Breaking of Microtubules During Axonal Stretch Injury: Predictions from a Mathematical Model, Biophysical Journal, 2014, 106(5):1123-1133.

(Continued)

*Primary Examiner* — Jonathan M Dunlap
(74) *Attorney, Agent, or Firm* — QUARLES & BRADY LLP

(57) ABSTRACT

A method of measuring a stress-strain curve in a cell-cell adhesion interface, the method including: providing a structure including a first movable island supported by a first beam, a second movable island supported by a second beam, and a gap therebetween connected by a pair of cells forming a junction, the pair of cells comprising a cell-cell adhesion interface having an initial length defined by a distance between nuclei of the pair of cells; moving the second movable island with a defined displacement; determining a displacement of the first movable island based on moving (Continued)

the second movable island; calculating a difference between the displacement of the first movable island and the defined displacement of the second movable island based on moving the second movable island; determining an applied strain in the cell-cell adhesion interface between the pair of cells based on the difference divided by the initial length of the cell-cell adhesion interface; calculating a force between the cell-cell adhesion interface of the pair of cells based on the displacement of the first movable island; calculating a stress in the cell-cell adhesion interface between the pair of cells based on the force; and determining the stress-strain curve of the cell-cell adhesion interface between the pair of cells by plotting the calculated stress against the applied strain.

19 Claims, 15 Drawing Sheets
(14 of 15 Drawing Sheet(s) Filed in Color)

(51) Int. Cl.
G01N 3/06 (2006.01)
G01N 19/04 (2006.01)
G01Q 60/28 (2010.01)

(52) U.S. Cl.
CPC ........... G01N 2203/0089 (2013.01); G01N 2203/0286 (2013.01); G01Q 60/28 (2013.01)

(56) References Cited

U.S. PATENT DOCUMENTS

| | | | |
|---|---|---|---|
| 11,422,075 B2 * | 8/2022 | Pantano | G01N 3/068 |
| 11,609,084 B2 * | 3/2023 | Kang | G01N 3/08 |
| 2006/0059984 A1 * | 3/2006 | Doktycz | G01Q 60/42 73/161 |
| 2010/0088788 A1 * | 4/2010 | Chasiotis | D01D 5/0007 850/33 |
| 2011/0317157 A1 * | 12/2011 | Kang | G01N 3/02 356/244 |
| 2021/0262783 A1 * | 8/2021 | Kang | G01B 11/16 |

OTHER PUBLICATIONS

Bays et al., Vinculin Phosphorylation Differentially Regulates Mechanotransduction at Cell-Cell and Cell-Matrix Adhesions, Journal of Cell Biology, 2014, 205(2):251-263.
Bays et al., Linking E-cadherin Mechanotransduction to Cell Metabolism Through Force-Mediated Activation of AMPK, Nature Cell Biology, 2017, 19(6):724-731.
Bertocchi et al., Nanoscale Architecture of Cadherin-Based Cell Adhesions, Nature Cell Biology, 2017, 19(1):28-37.
Bierkamp et al., Embryonic Heart and Skin Defects in Mice Lacking Plakoglobin, Developmental Biology, 1996, 180(2):780-785.
Bois et al., Pattern Formation in Active Fluids, Physical Review Letters, 2011, 106(2):028103, pp. 1-4.
Broussard et al., The Desmoplakin-Intermediate Filament Linkage Regulates Cell Mechanics, Molecular Biology of the Cell, 2017, 28(23):3156-3164.
Buckely et al., The Minimal Cadherin-Catenin Complex Binds to Actin Filaments Under Force, Science, 2014, 346 (6209):1254211, 22 pages.
Cai et al., Mechanical Feedback Through E-Cadherin Promotes Direction Sensing During Collective Cell Migration, Cell, 2014, 157(5):1146-1159.
Casares et al., Hydraulic Fracture During Epithelial Stretching, Nature Materials, 2015, 14(3):343-351.
Charras et al., Tensile Forces and Mechanotransduction at Cell-Cell Junctions, Current Biology, 2018, 28(8):R445-R457.
Chiquet et al., Gene Regulation by Mechanotransduction in Fibroblasts, Applied Physiology, Nutrition, and Metabolism, 2007, 32(5):967-973.
Chu et al., Force Measurements in E-cadherin-mediated Cell Doublets Reveal Rapid Adhesion Strengthened by Actin Cytoskeleton Remodeling through Rac and Cdc42, Journal of Cell Biology, 2004, 167(6):1183-1194.
Cumpston et al., Two-Photon Polymerization Initiators for Three-Dimensional Optical Data Storage and Microfabrication, Nature, 1999, 398(6722):51-54.
Ding et al., Genome Remodelling in a Basal-Like Breast Cancer Metastasis and Xenograft, Nature, 2010, 464(7291):999-1005.
Esfahani et al., Tissue Regeneration from Mechanical Stretching of Cell-Cell Adhesion, Tissue Engineering Part C: Methods, 2019, 25(11):631-640.
Friedrichs et al., A Practical Guide to Quantify Cell Adhesion Using Single-Cell Force Spectroscopy, Methods, 2013, 60(2):169-178.
Frohlich et al., New Techniques for Isolation of Single Prokaryotic Cells, FEMS Microbiology Reviews, 2000, 24(5):567-572.
Gardel et al., Mechanical Response of Cytoskeletal Networks, Methods in Cell Biology, 2008, 89:487-519.
Gumbiner, Regulation of Cadherin-Mediated Adhesion in Morphogenesis, Nature Reviews Molecular Cell Biology, 2005, 6(8):622-634.
Haidekker et al., Analysis of Temporal Shear Stress Gradients During the Onset Phase of Flow Over a Backward-Facing Step, Journal of Biomechanical Engineering, 2001, 123(5):455-463.
Harris et al., Characterizing the Mechanics of Cultured Cell Monolayers, Proceedings of the National Academy of Sciences, 2012, 109(41):16449-16454.
He et al., In Vitro Dynamic Strain Behavior of the Mitral Valve Posterior Leaflet, Journal of Biomechanical Engineering, 2005, 127:504-511.
Hu et al., Size- and Speed-Dependent Mechanical Behavior in Living Mammalian Cytoplasm, Proceedings of the National Academy of Sciences, 2017, 114(36):9529-9534.
Huang et al., Vinculin Forms a Directionally Asymmetric Catch Bond with F-actin, Science, 2017, 357(6352) 703-706.
Jiang et al., Temporal Gradients in Shear, but not Ramp Flow, Stimulate the Proliferation of Osteoblast-Like Cells, Journal of Bone Mineral Research, 2001, 16:S494-S494.
Jodoin et al., Stable Force Balance Between Epithelial Cells Arises from F-actin Turnover, Developmental Cell, 2015, 35(6):685-697.
Jurado et al., α-Catenin Stabilises Cadherin-Catenin Complexes and Modulates Actomyosin Dynamics to Allow Pulsatile Apical Contraction, Journal of Cell Science, 2016, 129(24):4496-4508.
Kadohama et al., Effects of Different Types of Fluid Shear Stress on Endothelial Cell Proliferation and Survival, Journal of Cellular Physiology, 2007, 212(1):244-251.
Kametani et al., Basal-to-Apical Cadherin Flow at Cell Junctions, Nature Cell Biology, 2007, 9(1):92-98.
Kashef et al., Quantitative Methods for Analyzing Cell-Cell Adhesion in Development, Developmental Biology, 2015, 401(1):165-174.
Khalilgharibi et al., The Dynamic Mechanical Properties of Cellularised Aggregates, Current Opinion in Cell Biology, 2016, 42:113-120.
Khalilgharibi et al., Stress Relaxation in Epithelial Monolayers is Controlled by the Actomyosin Cortex, Nature Physics, 2019, 15(8):839-847.
Klein et al., Elastic Fully Three-Dimensional Microstructure Scaffolds for Cell Force Measurements, Advanced Materials, 2010, 22(8):868-871.
Klein et al., Two-Component Polymer Scaffolds for Controlled Three-Dimensional Cell Culture, Advanced Materials, 2011, 23(11):1341-1345.
Legant et al., Multidimensional Traction Force Microscopy Reveals Out-of-Plane Rotational Moments about Focal Adhesions, Proceedings of the National Academy of Sciences, 2013, 110(3):881-886.
Liang et al., Measurement of Mechanical Tension at Cell-Cell Junctions Using Two-Photon Laser Ablation, Bio-Protocol, 2016, 6(24), 25 pages.

(56) References Cited

OTHER PUBLICATIONS

Liu et al., Mechanical Tugging Force Regulates the Size of Cell-Cell Junctions, Proceedings of the National Academy of Sciences, 2010, 107(22):9944-9949.

Lozano et al., Tumor Progression: Small GTPases and Loss of Cell-Cell Adhesion, BioEssays, 2003, 25(5):452-463.

Maiti et al., In Vivo Measurement of Skin Surface Strain and Sub-Surface Layer Deformation Induced by Natural Tissue Stretching, Journal of the Mechanical Behavior of Biomedical Materials, 2016, 62:556-569.

Manibog et al., Resolving the Molecular Mechanism of Cadherin Catch Bond Formation, Nature Communications, 2014, 5:3941, 11 pages.

Marion et al., Acto-Myosin Cytoskeleton Dependent Viscosity and Shear-Thinning Behavior of the Amoeba Cytoplasm, European Biophysics Journal, 2005, 34(3):262-272.

Najor, Desmosomes in Human Disease, Annual Review of Pathology: Mechanisms of Disease, 2018, 13:51-70.

Niessen et al., Tissue Organization by Cadherin Adhesion Molecules: Dynamic Molecular and Cellular Mechanisms of Morphogenetic Regulation, Physiological Reviews, 2011, 91(2):691-731.

Padala et al., Mechanics of the Mitral Valve Strut Chordae Insertion Region, Journal of Biomechanical Engineering, 2010, 132:081004, 9 pages.

Panorchan et al., Probing Intercellular Interactions Between Vascular Endothelial Cadherin Pairs at Single-Molecule Resolution and in Living Cells, Journal of Molecular Biology, 2006, 358(3):665-674.

Panorchan et al., Single-Molecule Analysis of Cadherin-Mediated Cell-Cell Adhesion, Journal of Cell Science, 2006, 119(1):66-74.

Park et al., Differential Effects of Equiaxial and Uniaxial Strain on Mesenchymal Stem Cells, Biotechnology and Bioengineering, 2004, 88(3):359-368.

Perlman et al., Alveolar Expansion Imaged by Optical Sectioning Microscopy, Journal of Applied Physiology, 2007, 103(3):1037-1044.

Priya et al., E-cadherin Supports Steady-State Rho Signaling at the Epithelial Zonula Adherens, Differentiation, 2013, 86(3):133-140.

Priya et al., Bistable Front Dynamics in a Contractile Medium: Travelling Wave Fronts and Cortical Advection Define Stable Zones of RhoA Signaling at Epithelial Adherens Junctions, PLoS Computational Biology, 2017, 13(3):e1005411, 19 pages.

Rakshit, Ideal, Catch, and Slip Bonds in Cadherin Adhesion, Proceedings of the National Academy of Sciences, 2012, 109(46):18815-18820.

Rodriguez-Boulan et al., Organization and Execution of the Epithelial Polarity Programme, Nature Reviews Molecular Cell Biology, 2014, 15(4):225-242.

Slomka et al., Evaluating the Effective Shear Modulus of the Cytoplasm in Cultured Myoblasts Subjected to Compression Using an Inverse Finite Element Method, Journal of the Mechanical Behavior of Biomedical Materials, 2011, 4(7):1559-1566.

Sundfeldt, Cell-cell Adhesion in the Normal Ovary and Ovarian Tumors of Epithelial Origin; An Exception to the Rule, Molecular and Cellular Endocrinology, 2003, 202(1-2):89-96.

Tabdili et al., Cadherin-Dependent Mechanotransduction Depends on Ligand Identity but not Affinity, Journal of Cell Science, 2012, 125(18):4362-4371.

Tambe et al., Collective Cell Guidance by Cooperative Intercellular Forces, Nature Materials, 2011, 10(6):469-475.

Tepass et al., Cadherins in Embryonic and Neural Morphogenesis, Nature Reviews Molecular Cell Biology, 2000, 1(2):91-100.

Thomas, Understanding the Counterintuitive Phenomenon of Catch Bonds, Current Nanoscience, 2007, 3(1):63-77.

Trepat et al., Effect of Stretch on Structural Integrity and Micromechanics of Human Alveolar Epithelial Cell Monolayers Exposed to Thrombin, American Journal of Physiology-Lung Cellular and Molecular Physiology, 2006, 290(6):L1104-L1110.

Vedula et al., Quantifying Forces Mediated by Integral Tight Junction Proteins in Cell-Cell Adhesion, Experimental Mechanics, 2009, 49(1):3-9.

Vishen et al., Soft Inclusion in a Confined Fluctuating Active Gel, Physical Review E, 2018, 97(3):032602, 16 pages.

Waugh et al., Shear Rate-Dependence of Leukocyte Cytoplasmic Viscosity, In Cell Mechanics and Cellular Engineering, pp. 33-44, Springer, New York, NY, 1994.

Yang et al., Techniques to Stimulate and Interrogate Cell-Cell Adhesion Mechanics, Extreme Mechanics Letters, 2018, 20:125-139.

Zhang et al., Review and Perspective on Soft Matter Modeling in Cellular Mechanobiology: Cell Contact, Adhesion, Mechanosensing, and Motility, Acta Mechanica, 2017, 228(12):4095-4122.

\* cited by examiner

IN SITU MECHANICAL CHARACTERIZATION OF A SINGLE CELL-CELL ADHESION INTERFACE UNDER LARGE STRAIN

CROSS-REFERENCE TO RELATED APPLICATIONS

This application is based on, claims priority to, and incorporates herein by reference in its entirety U.S. Provisional Application Ser. No. 63/077,264, filed Sep. 11, 2020, and entitled, "In Situ Mechanical Characterization of a Single Cell-Cell Adhesion Interface Under Large Strain."

GOVERNMENT SUPPORT STATEMENT

This invention was made with government support under P20 GM113126 and P30 GM127200 awarded by the National Institutes of Health, under 1826135 awarded by the National Science Foundation, and under DE-AC05-00OR22725 awarded by the U.S. Department of Energy. The government has certain rights in the invention.

BACKGROUND

Adhesive organelles between neighboring epithelial cells form an integrated network to withstand external and internal forces. As part of normal physiology, this integrated network is constantly exposed to mechanical stress and strain, which is essential to normal cellular activities, such as proliferation, migration, differentiation, and gene regulation in the process of a diverse portfolio of functions in tissue morphogenesis and wound healing. A host of developmental defects or clinical pathologies in the form of compromised cell-cell associations will arise when cells fail to withstand external mechanical stress due to genetic mutations or pathological perturbations. Indeed, since the mechanical stress is mainly sustained by the intercellular junctions, mutations or disease-induced changes in junction molecules and components in adherens junctions and desmosomes lead to cell layer fracture and tissue fragility, which exacerbate the pathological conditions. This clinical relevance gives rise to the importance of the understanding of biophysical transformations when cells are subjected to load.

Cell-cell adhesions are often subjected to mechanical strains of different rates and magnitudes in normal tissue function. This is particularly true under large strain conditions which may potentially lead to cell-cell adhesion dissociation and ultimately tissue fracture. However, the rate-dependent mechanical behavior of individual cell-cell adhesion complexes has not been fully characterized due to the lack of proper experimental techniques and therefore remains elusive.

Cells often experience strains of tens to a few hundred percent at strain rates of 10 to 100% $s^{-1}$ in normal physiological conditions. They have many mechanisms to dissipate internal stress produced by external strain to avoid fracture, often via cytoskeleton remodeling and cell-cell adhesion enhancement. The coping mechanisms are different in time scale. Cytoskeleton remodeling can dissipate mechanical stress promptly due to its viscoelastic nature and actomyosin-mediated cell contractility. One study in cell monolayers showed the actomyosin regulated stress relaxation when cells are connected with robust adherens junctions in a biphasic response, with an initial viscoelastic phase within a few seconds and a prolonged response of a few minutes.

Adhesion enhancement at the cell-cell contact is more complex in terms of time scale. Load-induced cell-cell adhesion strengthening has been shown by the increase in the number of adhesion complexes or clustering of adhesion complexes, which occurs on the order of a few minutes to a few hours after cells experience an initial load. Studies also showed that increased load on the cell-cell contact results in a prolonged cell-cell dissociation time, suggesting cadherin bonds may transition to catch bonds in certain loading conditions, which can occur within seconds.

It is generally accepted that stress accumulation in the cytoskeleton network and potentially in the cytoplasm is strain-rate dependent. With the increase in cellular tension, failure to dissipate the stress within the cell layer at a rate faster than the accumulation will inevitably lead to the fracture of the cell layer. To date, there is a lack of understanding about the rate-dependent behavior of the cell-cell adhesion complex, particularly about which of the aforementioned coping mechanisms are at play across the spectrum of strain rates, and about how the stress relaxation by the cytoskeleton coordinates with the enhancement of the cell-cell adhesion under large strains leading to fracture.

To characterize the intricacy of the biophysical and biochemical response of individual cell-cell adhesion complex under large strain, a functional technique needs to fulfill the following requirements. First, it should have a highly sensitive force sensing component that allows easy quantification of pico- or nano-newton forces. Second, it should have the capability to apply mechanical strain or stress in a controlled manner. Third, the testing can be conducted under physiologically relevant conditions, especially allowing the formation of mature cell-cell junctions and cell-ECM adhesions. Several widely used techniques in the quantitative assessment of cell-generated forces include traction force microscopy and elastomer-based micropillar arrays. In addition, micro-scaffolds fabricated by 3D printing have been used to measure cell forces in a 3D microenvironment.

Although these quantification methods provide great insight into the actin-based ECM adhesion networks, they are restricted to static observations and fail to apply desirable mechanical stimuli. Techniques exist to apply mechanical strain to a monolayer of cells, but the stress within an individual cell-cell adhesion cannot be determined. Further, when a load is applied to individual cell-cell junctions, the majority of the studies are carried out on isolated suspended cells where mature intercellular junctions are yet to form, and the focus can only be placed on the separation of the cadherin bonds while the effect of stress relaxation of the cytoskeleton and the cell-ECM interactions are ignored.

SUMMARY OF THE PRESENT DISCLOSURE

The present disclosure provides systems and methods for the design and fabrication of a polymeric microstructure using two-photon polymerization and systems and methods for performing a displacement-controlled tensile test of a pair of adherent epithelial cells. Straining the cytoskeleton-cell adhesion complex system reveals a shear-thinning viscoelastic behavior and a rate-dependent stress accumulation phenomenon that agrees with a linear cytoskeleton growth model. Further, under considerably large strain (>150%), cadherin bond dissociation exhibits rate-dependent strengthening, in which increased strain rate results in elevated stress levels at which cadherin bonds fail. The remarkable tensile strength of a single cell adhesion complex under large strains facilitated by cytoskeleton stress relaxation and cadherin bond strengthening are discussed.

A single cell-cell adhesion interrogation and stimulation platform is developed based on nanofabricated polymeric structures using two-photon polymerization (TPP). This is a platform that allows in situ investigation of stress-strain characteristics of a cell-cell junction through defined strain and strain rate. Two movable islands, supported with beams of known or defined stiffness, are mechanically coupled through the formation of a mature junction between epithelial cells on each island. Integrating the polymeric microstructure with atomic force microscopy (AFM) enables the cell pair to stretch with precisely controlled strain rates, while the deformation of the supporting beams informs the resultant stress accumulated at the cell-cell junction.

The resolution of the sensing beams, capable of resolving the discrete breakage of a few bonds, enables the study of the adhesion failure as a collection of the bond rupture events. With this technique, biophysical phenomena can be revealed at the single cell-cell adhesion interface that was previously not possible to be observed using existing techniques, promoting a paradigm shift in the mechanical characterization of cell-cell adhesions. A single cell pair system behaves like a shear-thinning viscoelastic material under tensile stress, following an active mechanosensing constitutive model. The single cell adhesion complex between an adherent cell pair fails at remarkably large strains in a symmetrical failure pattern with discrete bond ruptures at the edge of the cell-cell contact. Further, the rate-dependent dissociation of cell-cell adhesion complexes is described.

Thus, in one aspect, the disclosure provides a method of measuring a stress-strain curve in a cell-cell adhesion interface, including: providing a structure including a first movable island supported by a first beam, a second movable island supported by a second beam, and a gap therebetween connected by a pair of cells forming a junction, and the pair of cells comprising a cell-cell adhesion interface having an initial length defined by a distance between nuclei of the pair of cells; moving the second movable island with a defined displacement; determining a displacement of the first movable island based on moving the second movable island; calculating a difference between the displacement of the first movable island and the defined displacement of the second movable island based on moving the second movable island; determining an applied strain in the cell-cell adhesion interface between the pair of cells based on the difference divided by the initial length of the cell-cell adhesion interface; calculating a force between the cell-cell adhesion interface of the pair of cells based on the displacement of the first movable island; calculating a stress in the cell-cell adhesion interface between the pair of cells based on the force; and determining the stress-strain curve of the cell-cell adhesion interface between the pair of cells by plotting the calculated stress against the applied strain.

In some embodiments of the method, moving the second movable island may include moving the second movable island using atomic force microscopy (AFM). In other embodiments of the method, moving the second movable island may include moving the second movable island using a nanopositioner. In various embodiments of the method, the pair of cells may form the junction after culturing of the cells for a period of time. In certain embodiments of the method, calculating a stress in the cell-cell adhesion interface may include: calculating the stress in the cell-cell adhesion interface based on dividing the applied force at the cell-cell adhesion interface by a cross-sectional area of the cell-cell adhesion interface. In some embodiments of the method, the structure may be developed based on a nanofabricated polymeric structure using two-photon polymerization. In particular embodiments of the method, each of the first beam may have a first defined stiffness and the second beam may have a second defined stiffness. In certain embodiments of the method, at least one of the first defined stiffness or the second defined stiffness may be measured by deforming the first beam or the second beam using an AFM probe having a known stiffness. Various embodiments of the method may further include applying a stain to the pair of cells to visualize the cell-cell adhesion between the pair of cells and the focal adhesion points between each of the pair of cells and the structure. In some embodiments of the method, the structure may further include a cell confinement structure, wherein a first portion of the cell confinement structure may be attached to the first movable island and a second portion of the cell confinement structure may be attached to the second movable island, and each of the pair of cells may be disposed within the first portion or the second portion of the cell confinement structure such that the pair of cells forms the junction between them to connect the two movable islands. In particular embodiments of the method, moving the second movable island may include: moving the second movable island in a direction away from the first movable island. In some embodiments of the method, determining a displacement of the first movable island may include: determining a displacement of the first movable island using digital image correction (DIC). In various embodiments of the method, moving the second movable island with a defined displacement may further include: measuring the defined displacement using digital image correction (DIC).

In another aspect, the disclosure provides an apparatus for performing a displacement-controlled tensile test of a pair of cells, including: a first movable island supported by a first supporting beam having a first defined stiffness; and a second movable island supported by a second supporting beam having a second defined stiffness, the first moveable island and the second moveable island defining a junction therebetween having an initial length.

Some embodiments of the apparatus may further include a first cell confinement structure attached to the first moveable island and a second cell confinement structure attached to the second movable island. In various embodiments of the apparatus, a pair of cells may be disposed within the first and second cell confinement structures. In certain embodiments of the apparatus, the first moveable island and the second moveable island may be attached to an optically transparent substrate. In particular embodiments of the apparatus, the optically transparent substrate may be optically coupled to an inverted microscope configured to monitor movement of the first moveable island and the second moveable island using digital image correlation (DIC). In certain embodiments of the apparatus, the apparatus may be configured to stretch the junction at a controlled strain rate by applying force to the second moveable island using atomic force microscopy (AFM). In some embodiments, the apparatus may be configured to stretch the junction at a controlled strain rate by applying force to the second moveable island using a nanopositioner.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings are provided to help illustrate various features of example embodiments of the disclosure and are not intended to limit the scope of the disclosure or exclude alternative implementations.

FIG. 1, panel A is a single cell pair with junctional contacts formed on Islands 1 and 2 (each cell residing on the scaffolds on each island). To apply mechanical strain to the cell-cell junction, an AFM-based manipulation system displaces Island 2. FIG. 1, panel B shows the applied displacement strains the mutual junction between the cells and bends the vertical beam under Island 1; a force-displacement relationship can be established by recording the bending, δ, FIG. 1, panel C shows the structure was fabricated on top of a glass substrate with a height of 280 μm and a thickness of 2 μm for the vertical beams; lateral links and struts were added between the vertical beams to provide stability to the structure; this forms the double "A-shaped" beam structures that support the two movable islands; a bowtie structure was also fabricated on top of each island for cell confinement, the scale bar is 200 μm; FIG. 1, panel D shows procedures for calibrating beam stiffness in which the two islands were spaced 6 μm apart with a spacing of 2 μm between the cell-confining bowties; the space allows the two islands to be physically separated during the TPP crosslinking and allows for the formation of the cell-cell junction; the structure is held with support horizontally under the AFM setup to measure its stiffness, the scale bar is 50 μm, FIG. 1, panel E shows the AFM probe approaches the structure and applies force until a force set point is achieved, it then retracts; the AFM records the applied force, $P_{AFM}$, and vertical displacement of the piezo head, d; the vertical structure displacement, $\Delta x_{act}$, and deflection of the AFM probe, $\Delta x_p$, are also represented and are determined from the AFM output, FIG. 1, panel F shows an averaged force, $P_{AFM}$, vs. displacement, d, plot from the stiffness calibration measurement; both the approach and withdrawal were averaged when extracting the actuating structure stiffness; the inset image was taken during the stiffness measurement and shows the probe applying force onto the structure.

FIG. 2, panel A shows cell deposition onto the fabricated structure and shows the ability to place cells in the opposing bowtie confinement scaffolds; FIG. 2, panel B is a pair of cells formed into a mature cell-cell junction 16 hours after cell deposition and incubation as shown by the expression of E-cadherin GFP; the cell junction spans across the gap between the two movable islands; cells were stained for actin and the nucleus; FIG. 2, panel C demonstrates the biocompatibility of the structures, A431 GFP-tagged E-cadherin cells were deposited and after 16 hours, actin filaments were stained; E-cadherin shows the cell-cell junction formation and actin filaments show that cells spread over the structure; FIG. 2, panel D shows that zyxin and actin were stained to visualize the formation of cell-ECM adhesion (focal adhesion), confirming that cells successfully attach to and grow on the structures; FIG. 2, panel E shows a time-lapse study of cell growth after deposition was performed to find the optimized time for the stretch test; images show that cells do not form a junction before 8 hours, form a mature junction after 16 hours, and begin proliferating after 24 hours; in order to stretch a single cell pair, all experiments were performed around 16 hours after cell deposition; scale bars: FIG. 2, panel A: 100 μm; FIG. 2, panels B-E: 50 μm.

FIG. 3, panels A and B show a stretch test of a single cell pair with a 0.5% $s^{-1}$ strain rate that shows a smooth stress-strain curve with a 50 μm displacement of island 2; the cytoskeleton and the cadherin bonds were stretched to a maximum strain of 221.8% without structural failure; the series of optical images of the cell-cell junction show that cytoskeleton remodeling dominates the response at low strain rate; data in FIG. 3, panel B represents results from 11 tests; the red curve (Rep. test) displays the stress-strain curve corresponding to the test in FIG. 3, panel A; the same applies to the following strain rates; FIG. 3, panels C and D show a stretch test of a single cell pair performed at 5% $s^{-1}$ strain rate with 50 μm displacement of island 2 that shows the cadherin bonds begin to rupture at 39% strain; stiffening helps the junction to partially recover, resulting in a plateau region in the stress-strain curve until it fails at 217.8% strain; since the bond ruptured slowly, the stress at the rupture point is less than the other two strain rates; data in FIG. 3, panel D represents results from 12 tests; FIG. 3, panels E and F show a stretch test of a single cell pair performed at 25% $s^{-1}$ strain rate with 50 μm displacement of island 2 that shows the cadherin bonds begin to rupture at 90% strain; data in FIG. 3, panel F represents results from 7 tests; FIG. 3, panels G and H show a stretch test of the single cell pair at 50% $s^{-1}$ strain rate with 50 μm displacement of island 2 shows the bond ruptured suddenly at its failure point; data in FIG. 3, panel H represents results from 7 tests; scale bars: FIG. 3, panels A, C, E, and G: 50 μm; inset in FIG. 3, panels B, D, F, H: 15 μm.

FIG. 4, panel A is a diagram of the modified standard linear solid (MSLS) model that was used for fitting experimental data; the model consists of two branches, an elastic branch (top) consisting of a linear spring that represents the stiffness of the cell membrane ($E_1$) and a Maxwell branch (bottom) consisting of a spring ($E_2$) and a dashpot (η), representing the stiffness and viscosity of the intercellular components, respectively; the spring $E_2$ represents the collective modulus of the cytoskeleton (inset of FIG. 4, panel A); the growth model depicts the rate change in the resting length of the spring in the Maxwell branch ($\dot{\varepsilon}_0$) as proportional to the strain rate in that spring ($\dot{\varepsilon}_{S2}$); FIG. 4, panels B and C illustrate stress-strain curves obtained by applying stretch at different strain rates (0.5% $s^{-1}$, 5% $s^{-1}$, 25% $s^{-1}$, and 50% $s^{-1}$), the curves were fitted using the constitutive equation according to the MSLS model; FIG. 4, panels D-F illustrate box plots comparing the values of $E_1$ (FIG. 4, panel D), η (FIG. 4, panel E) and α (FIG. 4, panel F) obtained from fitting the modified MSLS model on stress-strain curves for different strain rates; FIG. 4, panel G shows the logarithm of the viscosity of the cytoskeleton decreases linearly with respect to the logarithm of the strain rates, suggesting the rate dependent shear-thinning viscous behavior of cells; FIG. 4, panel H illustrates the stress-strain curves obtained by stretching cells treated with CN01 and Bleb, as well as control, at the rate of 0.5% $s^{-1}$ were fitted using the constitutive equation derived from the MSLS model; FIG. 4, panels I-K are box plots comparing the values of $E_1$ (FIG. 4, panel I), η (FIG. 4, panel J) and $E_2$ (FIG. 4, panel K) obtained from fitting the modified MSLS model on stress-strain curves for cells treated with CN01 and Bleb; for each box plot, the number of experiments is indicated on top of each graph; *: $p<0.05$, **: $p<0.01$.

FIG. 5, panel A is a representative force-displacement curve at 5% $s^{-1}$ strain rate that shows a typical response in necking and stiffening in fracture tests, as indicated by the arrows in the plot; three representative regions are shown in the inset; the drop in force between each data point represents the bond rupture events while the slight increase in force represents stiffening; FIG. 5, panels B and C illustrate a region of interest (ROI) of the force-displacement curve (black curve) and junction length (blue curve) that is shown in more detail (FIG. 5, panel B) with the outline of each cell traced in corresponding frames (FIG. 5, panel C); the overlay shows the change in cell-cell junction length and the shape of each cell over the rupture event (dark red in the first frame and light red in the last frame); FIG. 5, panel D shows stress levels at which the initiation of bond rupturing occurs for the tensile tests at different strain rates: 5% $s^{-1}$, 25% $s^{-1}$, and 50% $s^{-1}$; FIG. 5, panel E shows strain levels at which the initiation of bond rupturing occurs for the tensile tests at different strain rates: 5% (n=13), 25% $s^{-1}$ (n=16), and 50% $s^{-1}$ (n=7); FIG. 5, panel F shows average stress-strain curves for tensile tests at 5% $s^{-1}$ on cells with E-Cad siRNA knockdown and control siRNA; FIG. 5, panel G shows stress levels at which the initiation of bond rupturing occurs for the tensile tests at 5% $s^{-1}$ on cells with E-Cad siRNA knockdown (n=6) and control siRNA (n=8); FIG. 5, panel H shows strain levels at which the initiation of bond rupturing occurs for the tensile tests at 1 μm/s on cells with E-Cad siRNA knockdown (n=6) and control siRNA (n=8); *: p<0.05; scale bars: inset FIG. 5, panel C: 25 μm.

FIG. 6, panel A is a simplified illustration of the cell-cell adhesion junction with actin filament connected by E-Cad at the cell-cell contact; note that intermediate filaments and desmosomes are considered part of the mechanical contribution except the growth capacity; FIG. 6, panel B shows that at low strain rate, in addition to cadherin enhancement, cytoskeleton alignment and growth compensates the increased stress by the applied strain, and thus total bond rupture does not occur even at very large strain (250%); FIG. 6, panel C illustrates that at an intermediate strain rate, cytoskeleton remodeling through alignment and growth fail to relax all the stress produced by the continuously applied strain, thus the accumulation of stress leads to partial and gradual bond rupture before a full fracture of the cell adhesion complex; FIG. 6, panel D illustrates that at high strain levels, there is simply no time for cytoskeleton remodeling, thus a rapid accumulation of stress leads to a sudden fracture of the cell adhesion complex.

FIG. 7, panel A is a horizontal beam design with 5 parallel beams attached to the sensing island and 1 pair of beams attached to the actuating island; this design had the highest stiffness (K=1e$^5$ N/m) and was not able to measure the junction stress; scale bar=50 μm; FIG. 7, panel B is a horizontal beam design with 3 pairs of beams attached to the sensing and actuating islands, with the width decreased from 5 μm to 2.5 μm and length increased from 80 μm to 150 μm; the new stiffness was 4.6 N/m which is not low enough to measure the junction stress; scale bar=100 μm; FIG. 7, panel C is a horizontal beam design in which the sensing island beams are changed from the straight to the serpentine design which is less stiff; this design had 1.05 N/m stiffness which is still too stiff to measure the junction stress; scale bar=100 μm; FIG. 7, panel D illustrates force versus displacement of different designs plotted to compare and find their stiffness.

FIG. 8, panel A shows the vertical beam design was less stiff compared to the horizontal beam design and more stable during fabrication; the new design had a height of 280 μm and its stiffness was 0.22 N/m, which allows measurement of the junction stiffness; scale bar=50 μm; FIG. 8, panel B shows that the double A-shape design solved the background noise issue but it was not stable during fabrication and collapsed; scale bar=200 μm; FIG. 8, panel C shows the double A-shape design with the supporting truss was the final design because of its stiffness and stability; scale bar=50 μm; FIG. 8, panel D shows the force versus displacement of the vertical beam designs plotted to compare and find their stiffness.

FIG. 10, panel A illustrates 25 μm displacement and sudden release; scale bar: 50 μm; FIG. 10, panel B shows displacement versus time for the 25 μm displacement; scale bar: 25 μm; FIG. 10, panel C illustrates 50 μm displacement and sudden release; FIG. 10, panel D shows displacement versus time for the 50 μm displacement; scale bar: 25 μm.

FIG. 11, panel A shows a cell that is targeted and the microcapillary approaches the cell using the 3D manipulator; FIG. 11, panel B shows a negative pressure applied with the pressure controller to aspirate and hold the cell; FIG. 11, panel C illustrates the manipulator moving the cell to the structure and a positive pressure is applied to deposit the cell on one of the islands; FIG. 11, panels D-F show the same steps performed to aspirate and deposit the second cell on the other island.

FIG. 12, panel A shows four representative frames for the actuating island depicting the initial and displaced markers used for displacement tracking; FIG. 12, panel B illustrates that the corresponding representative frames for the sensing island are shown with the initial and displaced markers; the number of markers is reduced for clarity; in the real calculation, one marker is assigned to each pixel in the ROI; FIG. 12, panel C shows parameter definitions for the strain and stress calculation.

FIG. 13, panel A: Control DMSO; FIG. 13, panel B: CN01; FIG. 13, panel C: Bleb; scale bar: 50 μm.

FIG. 15, panel A illustrates A431 GFP-E-cadherin cells transfected with control siRNA or E-cadherin siRNA; at 48 hours post-transfection, expression levels of E-cadherin protein were determined by immunoblot; actin protein levels were not affected by the transfection of the siRNA; the expected band size is 120 kDa; FIG. 15, panel B illustrates a GFP signal in GFP-tagged E-cadherin cells observed by fluorescence microscopy.

DETAILED DESCRIPTION OF THE PRESENT DISCLOSURE

Figure 1:
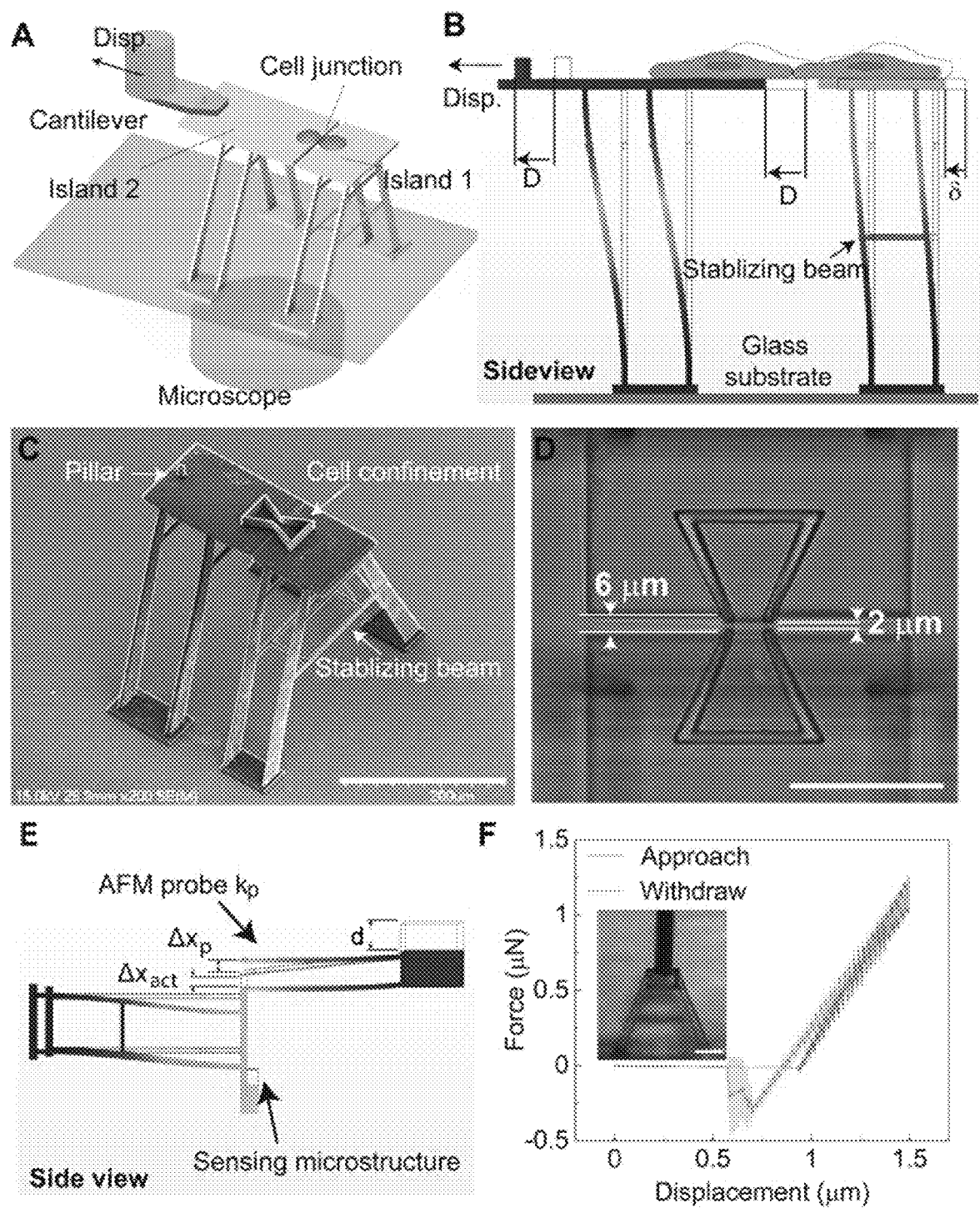
FIG. 1 is a single cell-cell adhesion interface mechanical characterization platform.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

The term "about," as used herein, refers to variation in the numerical quantity that may occur, for example, through typical measuring and manufacturing procedures used for articles of footwear or other articles of manufacture that may include embodiments of the disclosure herein; through an inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

A Single Cell Adhesion Complex Mechanical Characterization Platform

A microstructure (i.e., a structure with micrometer-scale features) has been designed and fabricated to interrogate the mechanical behavior of the cell-cell adhesion complex under large strain (FIG. 1A). This structure, fabricated from IP-S using TPP, consists of two movable islands on top of vertical "A-shaped" beams with known or defined stiffness. A pair of epithelial cells are deposited onto the movable islands with one on each side. The formation of a mature cell-cell junction between the cell pair (which can be two of the same type of cell or two different kinds of cells) mechanically couples the two islands. To interrogate the mechanical responses of the cell pair, Island 2 is displaced using a nanopositioner from an AFM system by capturing the pillar on it within a through-hole in the AFM probe in a precisely controlled manner, while Island 1 is consequently displaced by the tensional force transmitted through the cell-substrate adhesion and the cell-cell junction. The device is integrated on top of an inverted microscope for monitoring the displacement of the islands, from which the deformation of the supporting beams is determined with digital image correlation (DIC). Island 1, therefore, functions as a force sensor that can be used to measure nano-Newton range forces by relating its displacement to the spring constant of the beam that supports it (FIG. 1B).

Design, Fabrication, and Mechanical Characterization of the Sensing Structures

The stiffness of the beams was designed to be as close to the stiffness of the cell junction (0.01 N/m-0.5 N/m) as possible to acquire the best balance between force-sensing resolution and applied strain to the cell-cell junction, with the ability to measure a stress range of 0-12 kPa and force range of 0-50 nN at the junction. Compared with horizontal beams, vertical beams offer greater control of their length which allows for easy adaptation to this desired stiffness and offers better structural stability during the TPP fabrication process (as discussed below with reference to FIGS. 7 and 8). A set of vertical "A-shaped" beams (280 µm in height, 2 µm in thickness) were designed and fabricated considering different constraints in beam stiffness, beam stability, fabrication limitations, and imaging requirements. To confine the migration of the deposited cells, a bowtie structure was designed and fabricated with one trapezoid on each island. The area of the trapezoid and the length of its opening edge were optimized to preserve the physiological conditions for cell growth (FIG. 1C). The gap between the two movable islands, particularly between the bowtie opening where junction forms, should be kept to a minimum to facilitate junction formation, but a gap distance of less than 2 µm leads to unwanted polymerization of the resin during the fabrication process and tethers the two islands. The gap of the non-bowtie region was increased to 6 µm to reduce the risk of attachment of the islands (FIG. 1D).

To measure the stiffness of the "A-shaped" beam structure, a tipless cantilever probe with a known and thermally tuned stiffness was used to apply force on an isolated sensing structure with beam thickness of 6 µm (FIG. 1E). Using the displacement of the probe and the force measurement from the AFM probe, the deflection of the microstructure and subsequently, the stiffness was determined. For each measurement, the automated detection of the AFM was used to initiate contact between the probe and the structure. Once contact was established, a constant rate of probe displacement was initiated to apply force on the structure until the force set point was achieved. The probe was then retracted until it was no longer in contact with the structure before beginning the process again. This produced the force displacement curve from which a stiffness of the beam can be extracted (FIG. 1F). The calculated beam stiffness is 0.041±0.004 N/m under liquid conditions, which is within the desired range (as discussed below with reference to FIG. 9). TPP printing parameters, including laser power and scan speed, can have significant influence on the measured stiffness. In addition, the use of liquid also significantly reduces the stiffness of polymerized structures. Considering the resolution of DIC of a few tens of nanometers, this sensing beam stiffness can resolve the forces of a few cadherin bonds. Further, the elastic behavior of the sensing beam is confirmed with a stretch-and-release experiment showing negligible plastic deformation (as discussed below with reference to FIG. 10).

Formation of Cell-Cell Adhesion Junctions on the Platform

Figure 2:
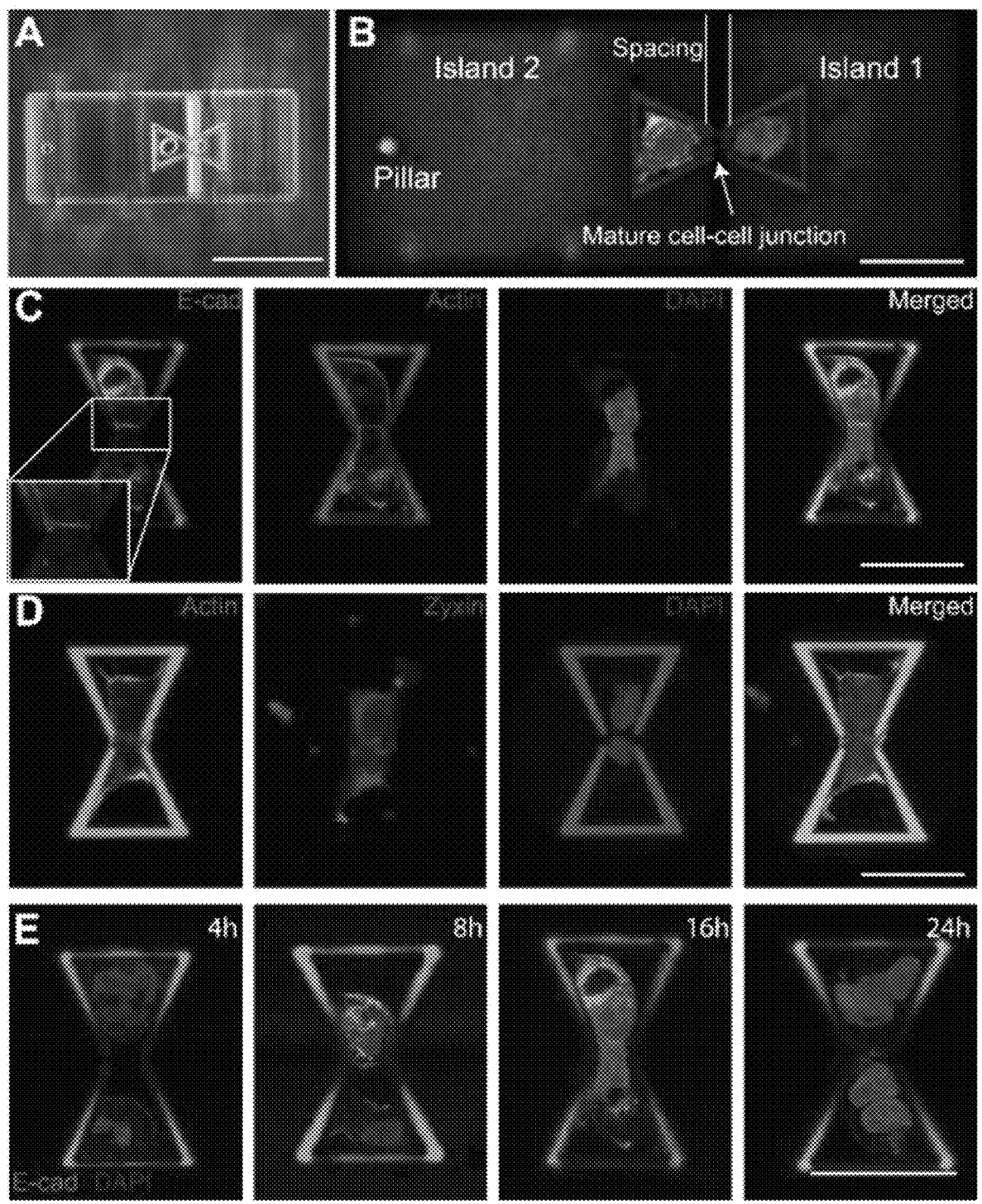
FIG. 2 is a cell-cell adhesion formation and cell growth on the scaffolds.
Figure 11:
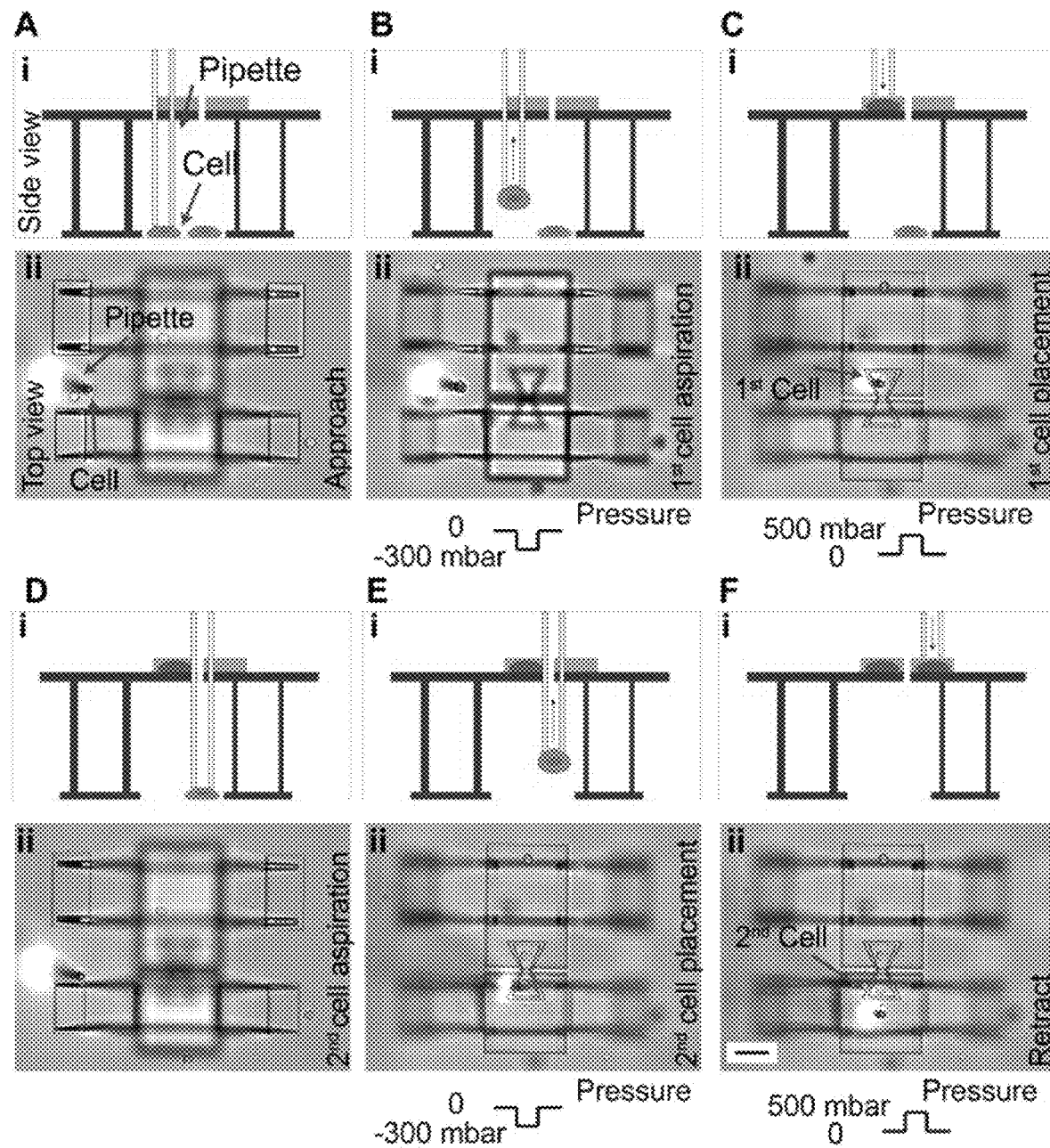
FIG. 11 illustrates a cell deposition procedure.

Cells are deposited into the bowtie structure using an Eppendorf single cell isolation setup which includes a pressure controller, a 3D manipulator, and microcapillary (as discussed below with reference to FIG. 11). To enhance cell attachment to the structure, fibronectin was used as the extracellular matrix (ECM) coating. As shown in FIG. 2A, a pair of A431 cells were successfully deposited and placed inside the bowtie structure. E-cadherin GFP-tagged cells were used, and 16 hours (h) after deposition and incubation, cells were stained for F-actin and nucleus. A mature junction is formed between the A431 cell pair by expressing E-cadherin, which bridges the gap between the two islands and mechanically couples them (FIG. 2B). The immunofluorescence images of these cells on the structure prove the biocompatibility of the polymer. E-cadherin expression shows the cell-cell junction formation and actin staining shows that cells spread on the structure (FIG. 2C). Staining zyxin, a focal adhesion protein, together with actin confirms that cells successfully form focal adhesions on the structure (FIG. 2D). To find the best time for mechanical characterization after cell deposition, a time-lapse study was performed (4 h, 8 h, 16 h, 24 h). The results showed that cells do not form a mature junction before 16 hours. However, they start proliferating after 24 hours, resulting in more than two cells within each bowtie confinement. Therefore, all experiments were conducted around 16 hours after cell deposition and incubation (FIG. 2E).

Displacement-Controlled Mechanical Characterization of the Cell-Cell Adhesion Interface To apply strain to the cell-cell junction, the test platform was placed with deposited cells under the AFM integrated with an inverted microscope. An AFM probe with a through-hole drilled at the front end using a focused ion beam (FIB) is positioned above the micropillar on Island 2 and then lowered to capture it within the through-hole. With this, displacement was applied and displacement rates were tried to investigate the mechanical behavior of the cell-cell junction with obtained stress-strain curves (as discussed below with reference to FIG. 12).

Figure 3:
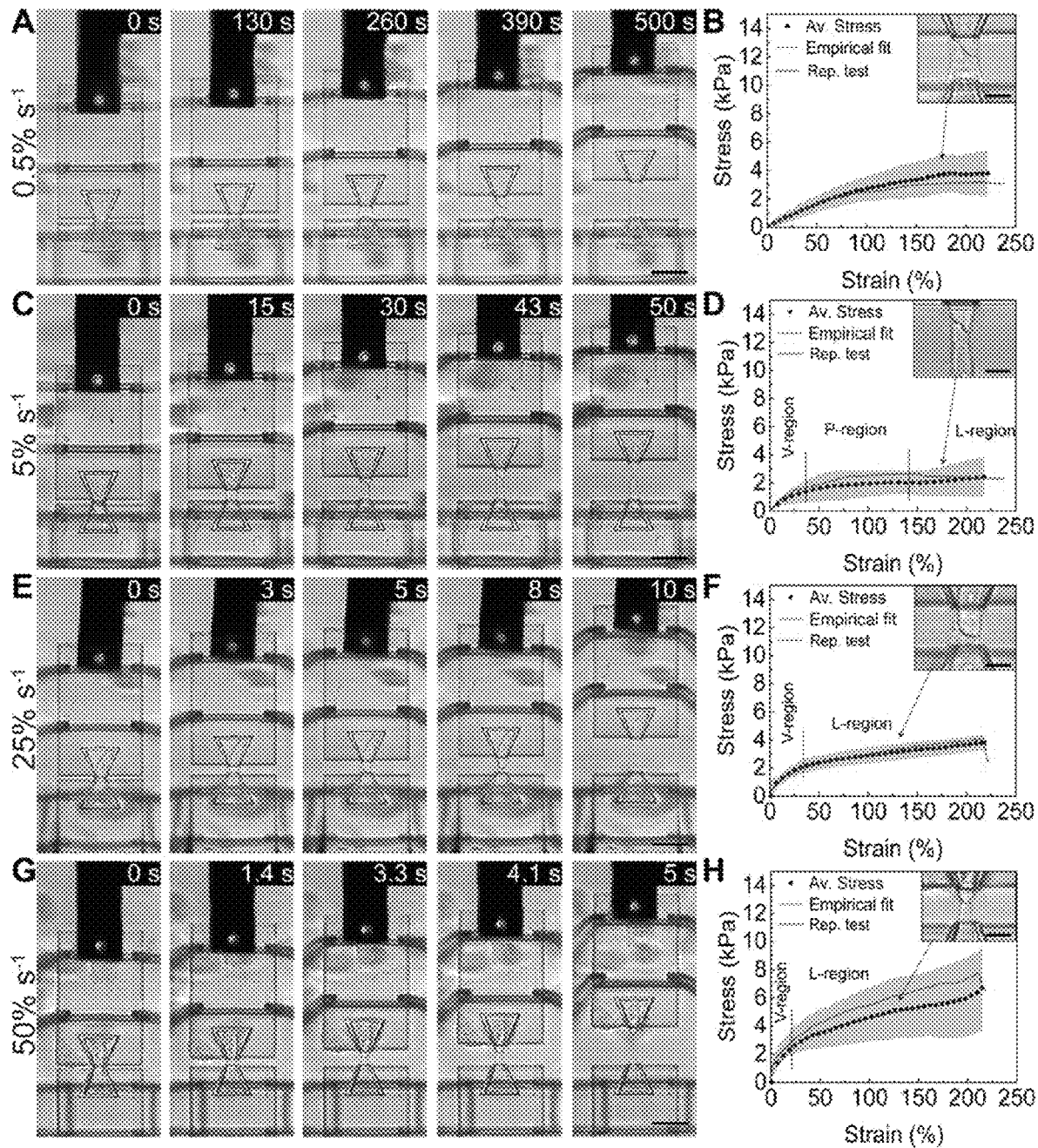
FIG. 3 is a displacement-controlled mechanical characterization of a single cell adhesion complex at different strain rates.

Four strain rates were examined ranging from 0.5% s$^{-1}$ to 50% s$^{-1}$ and different modes of stress relaxation and cell-cell adhesion failure were observed that are strongly strain-rate dependent. A 0.5% s$^{-1}$ strain rate (100 nm/s in displacement rate) was applied and substantially none of the junctions failed at the end of the 50 µm displacement. The stress-strain curve exhibits a typical viscoelastic behavior wherein the stress increases nonlinearly with a decreasing rate as the strain increases. A typical set of time series images shows that there is no sign of rupture in the cell-cell junction, which was elongated to 221.8+8.0% strain and tolerated maximum stress of 3.8±1.6 kPa (FIGS. 3A and 3B). Under a strain rate of 5% s$^{-1}$, cell-cell junctions begin to show some signs of rupture through a gradual necking process seen in the time series images and experience a maximum strain of 217.8+ 10% and stress of 2.4±1.4 kPa at the point of failure (FIGS. 3C and 3D). The stress-strain curve shows three different regions: a viscoelastic region from 0 to 39% strain, a plateau region from 39% to 142% strain (i.e., necking process), and a linear region up to failure at 217.8% strain. Similar observations can be made from a strain rate of 25% s$^{-1}$ with a less obvious plateau region, a higher stress level at failure, and more rapid and complete junction failure (FIGS. 3E and 3F). The existence of a stress plateau is due to the dissociation of cell-cell adhesion complexes which is able to fully dissipate the stress induced by mechanical stretching. However, the stress can only be partially dissipated when the strain rate further increases and therefore continues to rise as the strain level increases. At a 50% s$^{-1}$ strain rate, the stress-strain curve starts with a viscoelastic region, followed by a linear region up to the rupture point. The intersection of the two regions is at around 2.7 kPa stress (25% strain). A stress level of 6.7±3.01 kPa was observed at the failure point and it failed at 215.1+37.0% strain (FIGS. 3G and 3H). The gradual disappearance of the plateau region from low strain rate to high strain rate tests suggests that stress accumulation at high strain rate due to lagging and inadequate stress relaxation.

Tensile tests demonstrate that the cell pair can withstand a remarkably large strain level before it fails through cell adhesion rupture. At low rates, the cell-cell junction remains largely intact even when the strain is higher than 200%. Comparing with the 50% s$^{-1}$ strain rate, the lower maximum stress under the strain rate of 0.5% s$^{-1}$, where cell-cell adhesion complexes remain largely intact, indicates the existence of another effective stress dissipation scheme inside cells. Considering the dynamic nature of cytoskeletons among all the intracellular structures, the mechanical stress can be dissipated via remodeling and reorganization of their cytoskeletons. However, under high strain rates, the cell pair dissipates stress primarily through the dissociation of cell-cell adhesion complexes and complete breakage occurs at a strain level of ~200%. In addition, all failures occur at the cell-cell contact symmetrically through the rupture of the cell-cell adhesion complex. The image series of the tensile test (FIGS. 3A, 3C, 3E, and 3G) and the zoom-in images of the cell-cell adhesion region (inset of FIGS. 3B, 3D, 3F, and 3H) show decrease in the length of the mutual cell junction until complete separation, suggesting intermediate bond dissociation is accompanying the straining process which leads to ultimate cell adhesion complex failure. The absence of asymmetrical failure, potentially at the cytoskeleton to cell membrane tether at one side of the cell pair, implies that the cell-cell adhesion complex represents the weakest link in the cytoskeleton-cell adhesion-cytoskeleton system. Moreover, the rupture of the cell-cell adhesion complex occurs gradually at lower strain rates, like unzipping a zipper, with localized snap and retraction of cytoskeleton near the failure point at the edge of the cell-cell contact.

Figure 4:
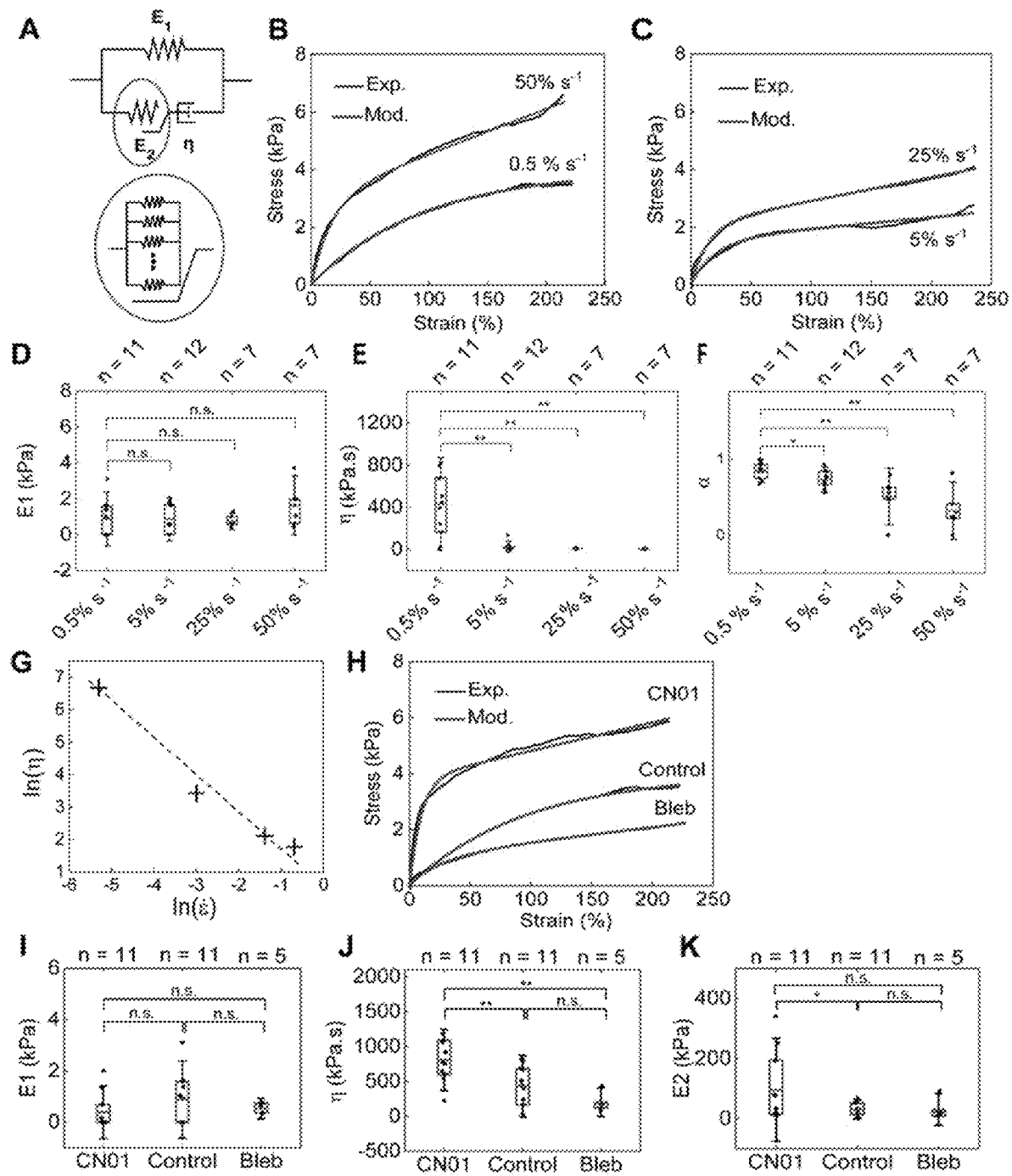
FIG. 4 shows a strain-rate dependent and actomyosin contractility controlled viscoelastic behavior of the cell pair.

A Mechanosensing Constitutive Model for the Viscoelastic Behavior of a Cell Pair The stress-strain relationship from the four types of tensile tests of varied strain rates can be well fitted with an empirical exponential growth function plus a linear function: $\sigma = -Ae^{-B\varepsilon} + C\varepsilon$, supporting an overall viscoelastic behavior. To delineate the viscoelastic behavior of the cell pair before cell-cell adhesion rupture under the mechanical stretch of different strain rates, a phenomenological constitutive model was developed that effectively incorporates a mechanosensing component to account for the stress dissipation mediated by cytoskeleton remodeling. Briefly, when a pair of cells are stretched, the cell membrane deforms along with their intracellular components. The viscoelastic response of the cell can be modeled using a modified standard linear solid (MSLS) model as shown in FIG. 4A, where the first spring with Young's modulus of $E_1$ represents the cell membrane while the second spring with Young's modulus of $E_2$ and the dashpot with the viscosity of $\eta$ represent the elastic and viscous elements of intracellular components, respectively.

The viscous component is contributed by the combined effect of cytoplasmic and cytoskeleton friction. Further, the cytoskeleton of adherent cells constantly undergoes reorganization through dynamic assembly and disassembly to maintain its mechanical homeostasis in response to the tensile load. Therefore, the elastic element of intracellular components is primarily contributed by the cytoskeleton, and $E_2$ can be considered as the collective moduli of all stress fibers that sustain the load and should be proportional to the number of individual stress fibers within the plane perpendicular to the stretching direction, as demonstrated by the inset in FIG. 4A. The value of $E_2$ should be collectively determined by the cell-cell junction length and cell-cell adhesion complex density. The continuous growth of the cytoskeleton leads to an increase in the resting length of the second spring, which could partially or even completely relax the passive stress ($\sigma_{S2}$) resulting from stretching:

$$\sigma_{S2} = E_2(\varepsilon_{S2} - \varepsilon_0) \quad (1)$$

where $\varepsilon_{S2}$ and $\varepsilon_0$ are the total strain of the second spring and the strain resulting from the continuous growth of the cytoskeleton, respectively. The cytoskeleton growth rate is related to the strain rate of the second spring through a model parameter a:

$$\dot{\varepsilon}_0 = \alpha \dot{\varepsilon}_{S2} \quad (2)$$

where $0 \leq \alpha \leq 1$. When $\alpha = 0$, $\dot{\varepsilon}_0 = 0$, suggesting that the cytoskeleton does not grow at all, which corresponds to the condition of a very high strain rate stretch. When $\alpha = 1$, Eqn. (2) reduces to $\dot{\varepsilon}_0 = \dot{\varepsilon}_{S2}$, indicating that the growth of the cytoskeleton is able to completely release the passive stress, which could occur under an extremely low strain rate stretching. Therefore, the value of a is an effective parameter to indicate the growth level of the cytoskeleton during the stretching test and thus the stress dissipation efficiency. The model predicts the following time-dependent relationship between stress ($\sigma_{tot}$) and strain ($\varepsilon_{tot}$):

$$\dot{\sigma}_{tot} + \frac{(1-\alpha)E_2}{\eta}\sigma_{tot} = [E_1 + (1-\alpha)E_2]\dot{\varepsilon}_{tot} + \frac{(1-\alpha)E_1 E_2}{\eta}\varepsilon_{tot} \quad (3)$$

Under a constant strain rate condition, Eqn. (3) yields:

$$\sigma_{tot} = E_1 \varepsilon_{tot} + \eta \dot{\varepsilon}_{tot}\left[1 - \exp\left(-\frac{(1-\alpha)E_2}{\eta}\frac{\varepsilon_{tot}}{\dot{\varepsilon}_{tot}}\right)\right] \quad (4)$$

As shown in FIGS. 4B and 4C, Eqn. (4) is able to robustly capture the viscoelastic responses of cells under different strain rates. Fitting the stress-strain curves obtained in the stretching tests with Eqn. (4) allows a prediction of how $E_1$, $(1-\alpha)E_2$ and $\eta$ vary with the strain rate. The model predicts that $E_1$ is independent of the strain rate and has an average value of ~1.2 kPa (FIG. 4D), which is consistent with previously reported values. The viscosity $\eta$ is predicted to monotonically decrease with the strain rate (FIG. 4E), suggesting that the cytoplasm is a shear-thinning material. Such a shear-thinning feature has been identified for the cytoplasm of several other types of cells previously. Plotting the predicted viscosity against the strain rate in a logarithmic scale reveals that the mechanical behavior of the cytoplasm can be approximated as a power-law fluid following the Oswald equation, i.e. $\eta = K \dot{\varepsilon}^{(n-1)}$, with the exponent of n=−0.118 (FIG. 4G). In general, shearing thinning is caused by flow-facilitated disentanglement of polymer chains, which is consistent with the enhanced alignment of cytoskeleton structures after cells are subjected to uniaxial stretching. Since both cells should have similar cytoskeleton structures to start with, the stress dissipation efficiency mediated by the cytoskeleton growth can be compared by assuming that $E_2$ has the same value. The decrease in α from the low strain rate test to the high strain rate test demonstrates that the stress dissipation efficiency decreases with strain rate as a result of a reduced cytoskeleton growth rate (FIG. 4F).

The cell pair was treated with cellular contractility modulators, RhoA Activator I: CN01, and myosin II inhibitor: blebbistatin (Bleb), to examine the impact of actomyosin activity on the mechanical behavior of the cell pair under mechanical stress. Stress-strain curves collected at 0.5% s$^{-1}$ strain rate show a clear contrast between samples treated with CN01, Bleb, and DMSO control. Specifically, CN01 raises the overall stress level compared with controls at the same strain, while Bleb reduces the stress accumulation (FIG. 4H, and further discussed below with reference to FIG. 13). The stress-strain curves were then analyzed using the constitutive model. Membrane stiffness, $E_1$, stays the same for all conditions (FIG. 4I). Enhancement of actomyosin contractility by CN01 significantly increases the viscosity, and the elastic moduli of the intracellular components, $E_2$, while Bleb reduces them (FIGS. 4J and 4K). The increase (decrease) in both η and $E_2$ by CN01 (Bleb) is consistent with the enhanced (reduced) stress fiber formation. Collectively, these data confirm that the stress dissipation is facilitated by the actin filament growth during tensile loading conditions.

Cadherins Strengthening Under Rate-Dependent Stretching

Figure 5:
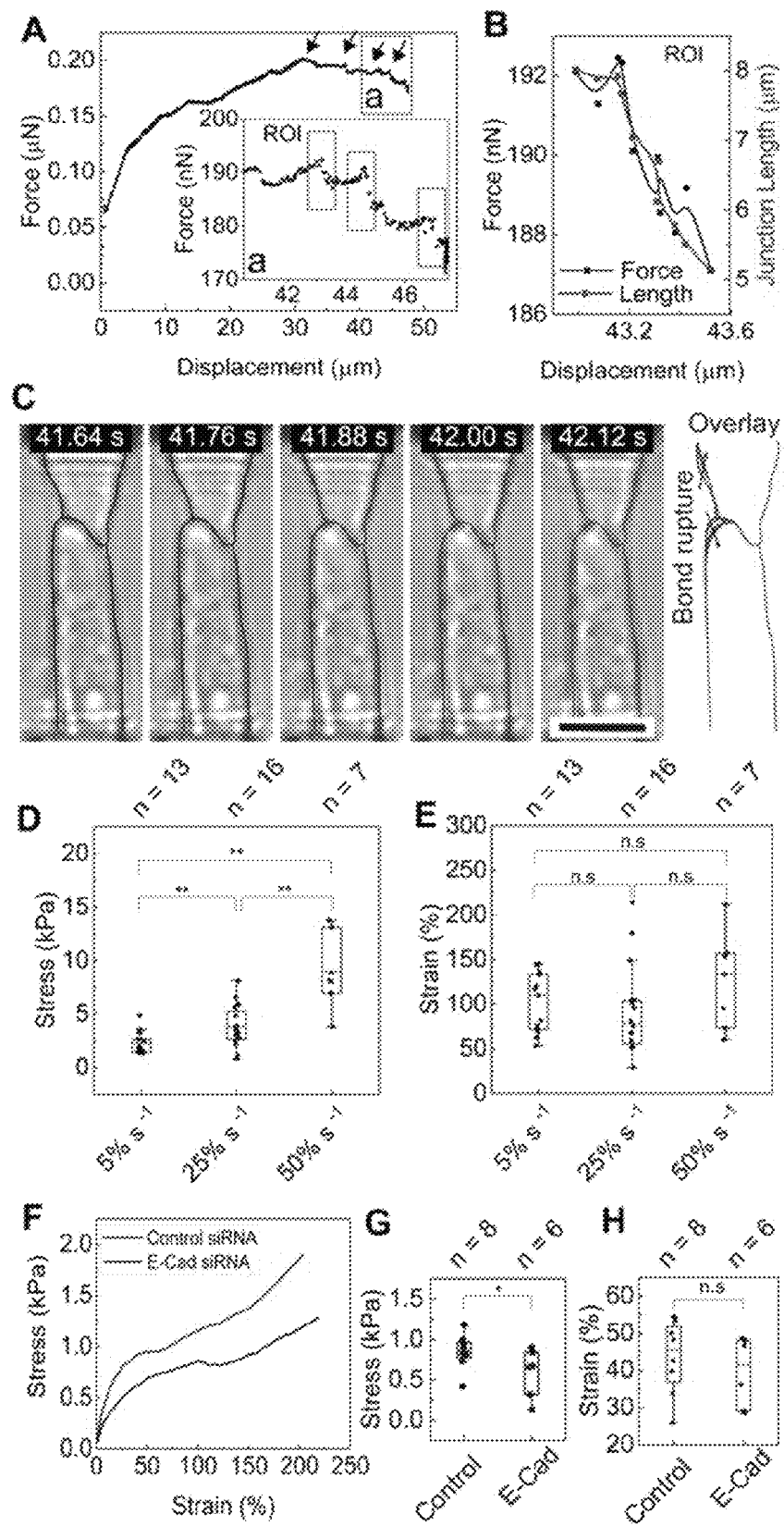
FIG. 5 demonstrates cadherin bond rupture that exhibits rate-dependent behavior during strain-rate controlled stretch.

The necking process can be attributed to the rupture of cell-cell adhesion bonds, which is most apparent under the intermediate strain rate. A few cadherin bonds are ruptured in discrete steps at the edge of the cell-cell junction, which corresponds to a small drop in the measured forces in the force-displacement curve (FIG. 5). To investigate the bond rupture, a representative example of the stretch tests with 5% s$^{-1}$ strain rate with obvious regions of junction rupture followed by stiffening can be selected, which is represented by each drop and rise in the curve (FIG. 5A). The rupture of bonds locally relaxes the stretched cell membrane, consequently leading to a drop of measured force. One representative region of interest (ROI) is plotted, in which a total drop of 5 nN was observed for an approximately 490 nm displacement (FIG. 5B, and as further discussed below with reference to FIG. 14). Correspondingly, a total of ten image frames were captured showing the snap and retraction of the cytoskeleton at the edge of the cell-cell junction (FIG. 5C), and each discrete snap motion corresponds to a small drop in force. Comparing this with the strength of a single cadherin bond of around 40 pN[60], shows that this decline is result of about a few hundred cadherin bonds rupturing in each discrete event with a resolution of a few bonds.

Figure 15:
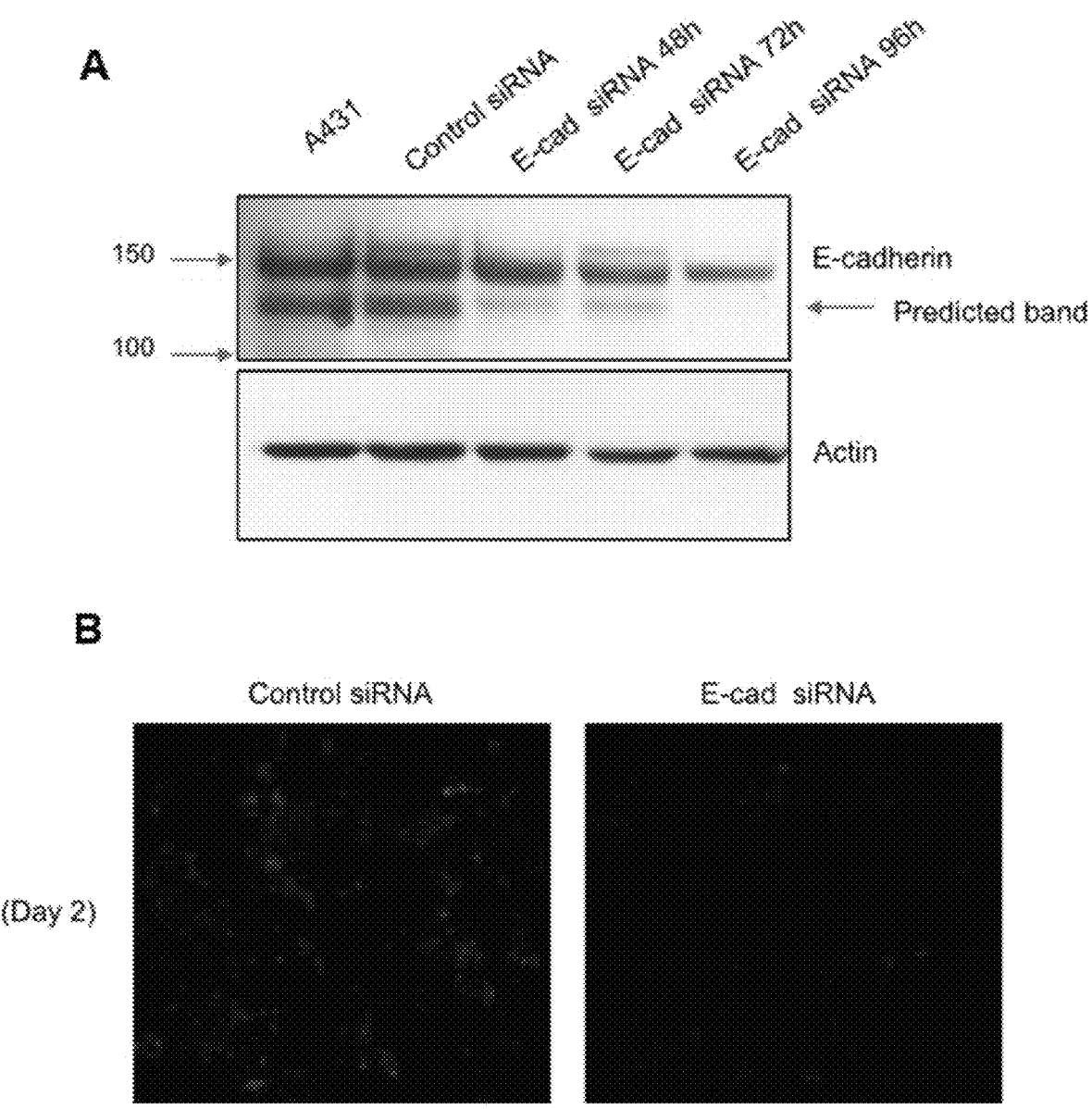
FIG. 15 is a confirmation of E-cadherin siRNA silencing.

The bond dissociation events also exhibit strong strain-rate dependency. First, at a very low strain rate (0.5% s$^{-1}$), the absence of bond rupture may be attributed to cadherin strengthening. It has been observed that cadherin bond clustering in epithelial cells under tensile load occurs in a time scale of minutes, right in line with the time span of a low-strain-rate tensile test (about 10 minutes). Second, the stress level at which cadherin bonds show initial signs of dissociation, or critical stress, increases significantly with increasing strain rate. As shown in FIGS. 5D and 5E, the initiation of bond rupture events occurs at similar strain levels (101.6%, 92.8%, 126.4%) for the three strain rates ($5\%$ s$^{-1}$, $25\%$ s$^{-1}$, and $50\%$ s$^{-1}$, respectively). However, the critical stress is significantly higher for $50\%$ s$^{-1}$ (8.9 kPa) compared with $5\%$ s$^{-1}$ and $25\%$ s$^{-1}$ (2.2 kPa and 3.8 kPa, respectively). In fact, this stress increases exponentially with the strain rate. Considering the time span of a few seconds for a tensile test at $50\%$ s$^{-1}$ strain rate (or 10 µm/s), bond clustering may not be the main contributor to the observed force increase. On the other hand, the observed increase in forces within cadherin bonds agrees well with reports from single molecule force microscopy studies of E-cadherin bonds, which show peak rupture force in cadherin bonds increases logarithmically with loading rate. Knockdown of E-cadherin (E-Cad) by siRNA resulted in a decrease in the stress levels when cadherin bonds start to unbind compared with controls, while the strain levels remain similar (FIGS. 5F-5H, and further discussed below with reference to FIG. 15). This data confirms that reduction in the number of E-Cad bonds decreases the load-bearing potential of the cell-cell junction and that E-Cad bonds play a major role in the rate-dependent strengthening of the cell-cell junction.

Rate Dependent Cell-Cell Adhesion Dissociation Under Large Strain

Figure 6:
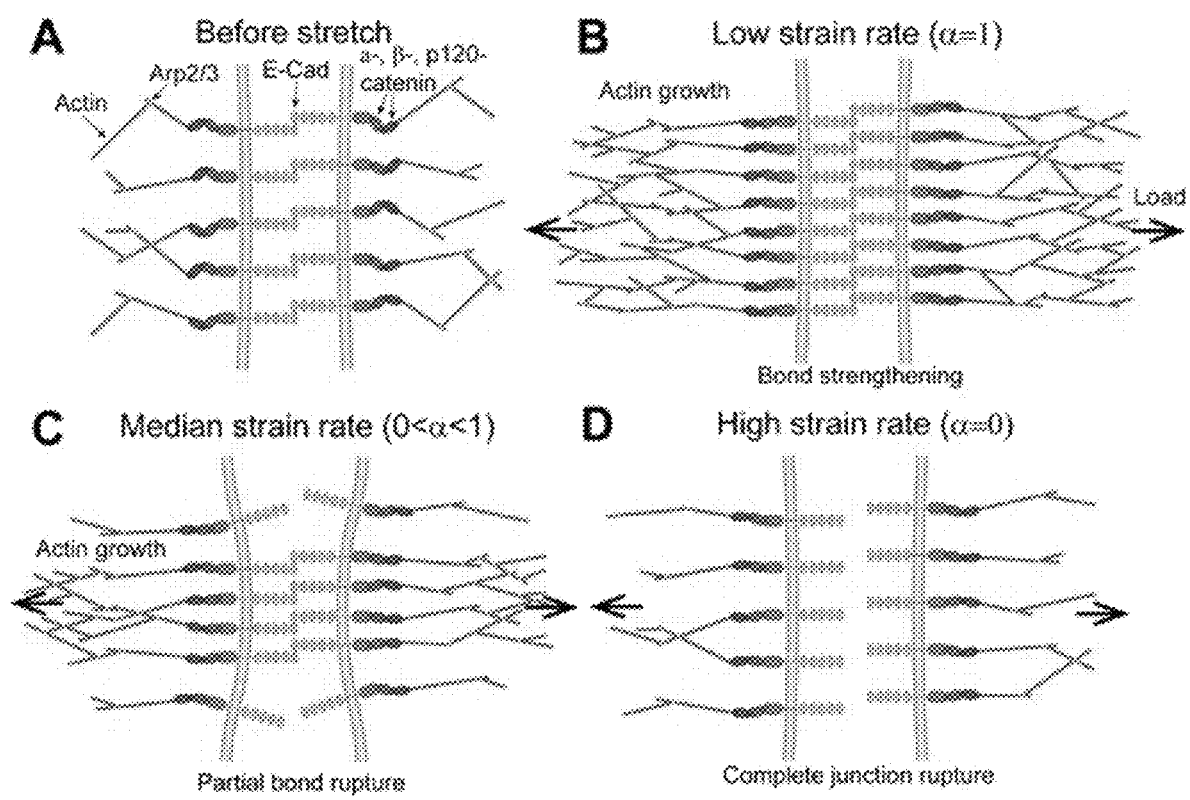
FIG. 6 is an illustration of three modes of cytoskeleton remodeling and cadherin bond rupturing under large strains at different strain rates.

The mechanical stretch at different strain rates reveals three different rate-dependent modes of stress dissipation and failure phenomenon at the cell-cell adhesion complex. First, the viscoelastic behavior of the cell pair at different strain rates depends on a robust intercellular adhesion. At low strain rate levels (such as $\dot{\varepsilon}=0.5\%$ s$^{-1}$), cell-cell adhesion through cadherin bonds remains intact, allowing continuous remodeling of the cytoskeleton through the alignment of the cytoskeleton to the tensile load direction. More importantly, it leads to the growth of actin filaments (a is high or close to 1), and thus the continuous stress relaxation in the network of the cytoskeleton and the cell-cell adhesion complex (as illustrated in FIGS. 6A and 6B). In addition, the clustering of cadherin bonds may also strengthen the cell-cell adhesion complex. This synergistic process keeps the stress level within the system below the threshold of rupturing a large cluster of cadherin bonds, and thus total bond rupture and tissue fracture do not occur even at very large strain (>200%). Second, at median strain rate (such as $\dot{\varepsilon}=5\%$ s$^{-1}$), stress relaxation from the cytoskeleton growth fails to catch the increased stress induced by the continuous increase of the applied strain, resulting in a net accumulation of stress. The increase in stress leads to gradual unbinding of cadherin bonds to relax the stress (FIG. 6C). Third, at high strain rate (such as $\dot{\varepsilon}=50\%$ s$^{-1}$), even a modest amount of cytoskeleton growth does not occur due to the short time span, and the rapid accumulation of stress ruptures all cadherin bonds in a synchronized fashion (FIG. 6D). As discussed earlier, due to the biophysical property of E-cadherin bonds, the stress level at which bond rupture occurs for high strain rate tests is higher. This concerted mechanism of stress relaxation by the actin filament growth and rate-dependent strengthening of E-cadherin bonds may eventually result in the cell-cell adhesion complex failing at similar strain levels at different strain rates.

The platform developed has distinct advantages over AFM-based single-cell force spectroscopy (SCFS) and dual micropipette aspiration (DPA) techniques, which have been previously used to study adhesion mechanics in isolated cell pairs. A major limitation of SCFS is an inability to interrogate mature cell-cell junctions because the system is limited by the adhesive strength between the cell and AFM tip, which is lower than the strength of a mature cell-cell junction. In addition, in SCFS, it is impossible to image the cell-cell junction as the junction moves vertically as it is stretched, leaving the focus plane. A major drawback of DPA is a lack of a mature cell-ECM junction. As the cells are held to the micropipette tip through negative pressure, they do not form a junction, and the sometimes extreme deformation of the cell at the micropipette tip may induce internal biochemical changes which may impact the physiology of the cell-cell junction. In addition, a constant strain rate cannot be achieved because the strain is applied in incremental steps. A common drawback between each of these methods is throughput for interrogating mature cell-cell junctions, as cells would need to be held in place by these devices for a long period of time before a single test could be performed. The design of the device according to an embodiment combines the advantages of each system while eliminating or mitigating these drawbacks. The arrangement of the cells allows for imaging of the cell-cell junction, cells can form strong and mature cell-ECM junctions with the device and cell-cell junctions with each other, and continuous strain can be applied. In addition, throughput for mature cell-cell junction interrogation is increased due to parallel sample preparation and testing, as the equipment for manipulating or stretching cells do not need to be used to hold cells in place during junction maturation. The presence of the mature cell-ECM junction allows for application of large strains as in DPA, whereas the force sensitivity of the beams achieves stress and strain resolution comparable to SCFS. Finally, another technique that has been used to interrogate adhesion molecules, such as cadherins, is single-molecule force spectroscopy. While this technique can accurately measure forces within bonds at a single-molecule level, the internal response from cells to stretching, which is crucial in understanding cell-cell adhesion mechanics, is lost in this experimental setup and fully captured in the design.

Integrated within a microscopy imaging system, the mechanical characterization studies can be combined with fluorescent imaging of cytoskeleton deformation and localization of cadherins and linker molecules when the single cell adhesion complex is subject to a tensile load of varying amplitudes and strain rates. Further, the tensile strength within the cytoskeleton-cell adhesion-cytoskeleton system can correlate with tensional fluorescence resonance energy transfer (FRET) sensors within the cadherin or linker molecules, and this correlation may ultimately delineate the force contribution of each component in maintaining the mechanical integrity of the complex and reveal mechanisms of mechanotransduction in a concerted effort with other cellular elements, such as the cytoskeleton and the cell-ECM adhesion. Despite the promising propositions, a limitation still exists in performing real-time fluorescence imaging with cells on the microstructures due to the strong autofluorescence of the polymer materials used for the TPP fabrication. Research efforts are ongoing to address this critical issue.

In summary, a polymeric microstructure was fabricated using TPP for displacement application and force sensing to examine the rate-dependent mechanical behavior of a single cell-cell adhesion complex. This platform can target the cell-cell contact of a single cell pair and strain their mutual junction, enabling the quantitative assessment of its mechanics at controlled strain rates and the examination of its failure at large strains. The fine resolution of the force sensing beams also enables capturing the dissociation of cell-cell adhesion bonds to reveal its failure mechanism. Displacement-controlled tensile tests reveal that the single cell-cell adhesion complex composed of the cytoskeleton structures from the cell pair and the cadherin adhesion molecules fails at a remarkably large strain level, and the failure process exhibits strain rate-dependent phenomena. This is predominantly facilitated by the relaxation of the actin networks and rate-dependent strengthening of cadherin molecules.

Embodiments of the invention described herein can be incorporated into a variety of applications and disciplines. For example, embodiments of the invention can be incorporated into medical devices to facilitate the study of drug penetration through barriers, diagnostics to study skin and heart diseases and cancer metastasis, and in biomedical engineering applications for predicting deformation and failure in artificial tissues. Accordingly, non-limiting example materials, methods, designs, fabrication, and calculations are discussed below.

EXAMPLE

Cell Culture and Transfection

A431 E-cadherin GFP-tagged cells were cultured in a growth medium composed of Dulbecco's modified Eagle's medium (DMEM) and supplemented with 10% fetal bovine serum (Chemie Brunschwig AG) and 1% penicillin-streptomycin (Invitrogen). The medium included CO2-independent growth medium (Gipco) supplemented with 2 mM L-glutamine (Gipco), 10% fetal bovine serum, and 1% penicillin-streptomycin. All solutions were filtered through 0.22 μm pore-size filters before use. Shortly before each experiment, PBS was replaced with 2 ml of the experimental medium. All experiments were performed in a temperature-controlled enclosed chamber at 37° C. Transfection of E-cadherin siRNA (Santa Cruz Biotechnology; SC35242) and control siRNA (Santa Cruz Biotechnology; SC37007) were performed using Lipofectamine RNAiMAX Transfection Reagent (Invitrogen), according to the manufacturer's protocol. The expression of GFP was analyzed by fluorescence microscopy after 48 hours.

E-Cadherin GFP Cell Line

Full-length human E-cadherin fused at its C-terminus to GFP was constructed by first inserting an E-cadherin cDNA into pEGFP-N2 (Clontech, Mountain View, CA) and then inserting the tagged construct into a derivative of the LZRS retroviral expression vector. The final cDNA construct was fully sequenced to ensure no errors were introduced during subcloning.

TPP Fabrication Process 3D models of the micromechanical structures for biological cell mechanical interrogation were compiled in COMSOL using the built-in CAD module. The compiled models were evaluated using the Solid Mechanics module (linear elastic materials approximation). Finite element analysis (FEA) in COMSOL allowed estimation of the spring constant of the flexible beams supporting the microscale plates for cell attachment. Various preliminary designs, including planar structures, were fabricated using TPP stereolithography and tested for stability during fabrication and susceptibility to damage by capillary forces after fabrication. The rationale behind this design is as follows. First, compared to doubly clamped (bridge) structures, singly clamped (cantilever) beams provide a more linear elastic response with significantly lower sensitivity to intrinsic stresses. Second, the parallelogram arrangement of the twin-beam leaf springs improves the leveling of the cell-bearing platforms and the overall mechanical stability of the devices. Furthermore, vertical beams separated by larger distances from the substrate are preferable over horizontal beams closer to the substrate due to the better ability of the former to withstand capillary forces after fabrication. Finally, the thinnest beams that could be reliably fabricated with high accuracy and yield were approximately 2.5 mm thick. This minimum thickness, combined with the targeted stiffness, dictated the width and the length of the beams in the implemented structures.

Figure 7:
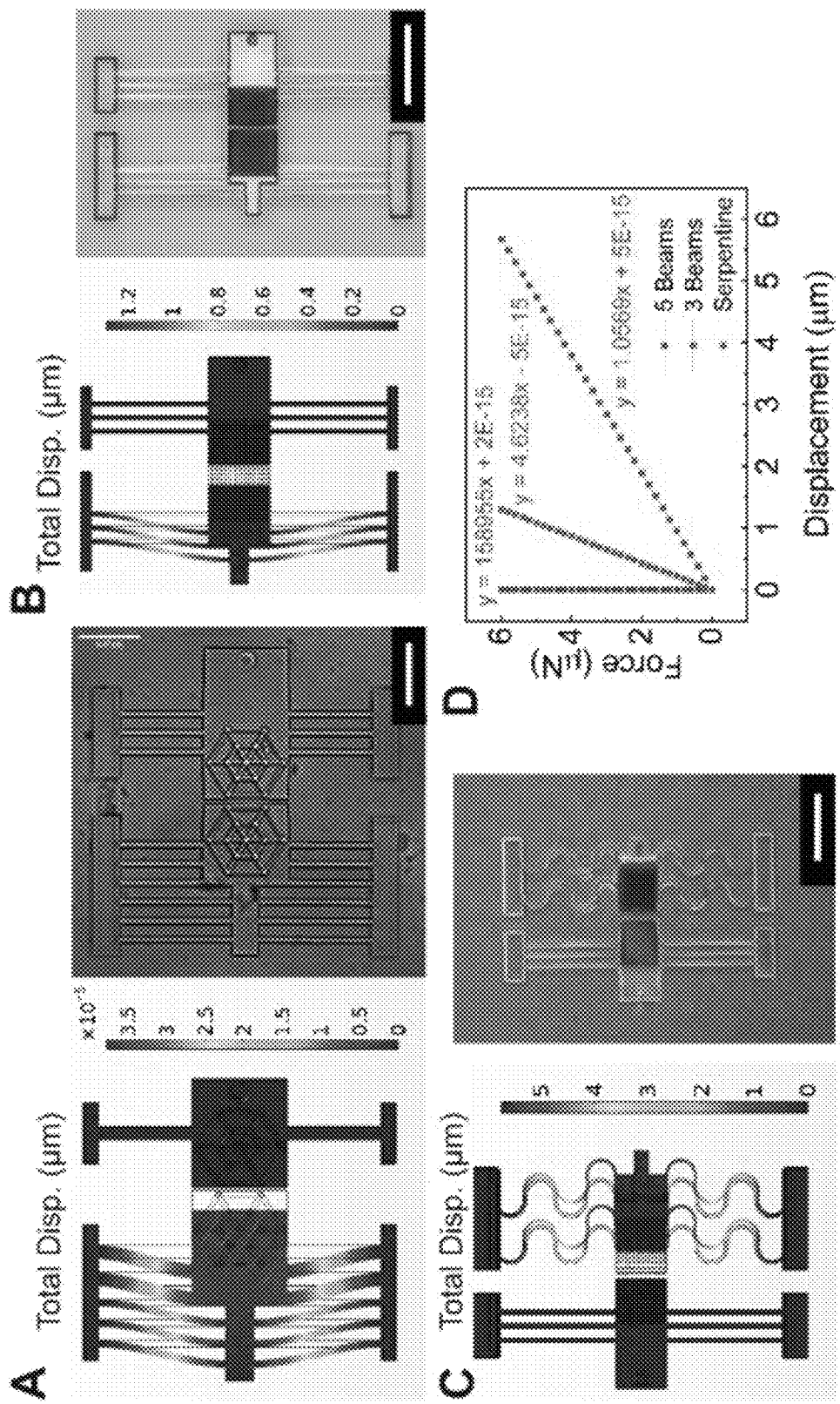
FIG. 7 is a design, simulation, and fabrication of the first generation of a single cell pair stretcher (horizontal)
Figure 8:
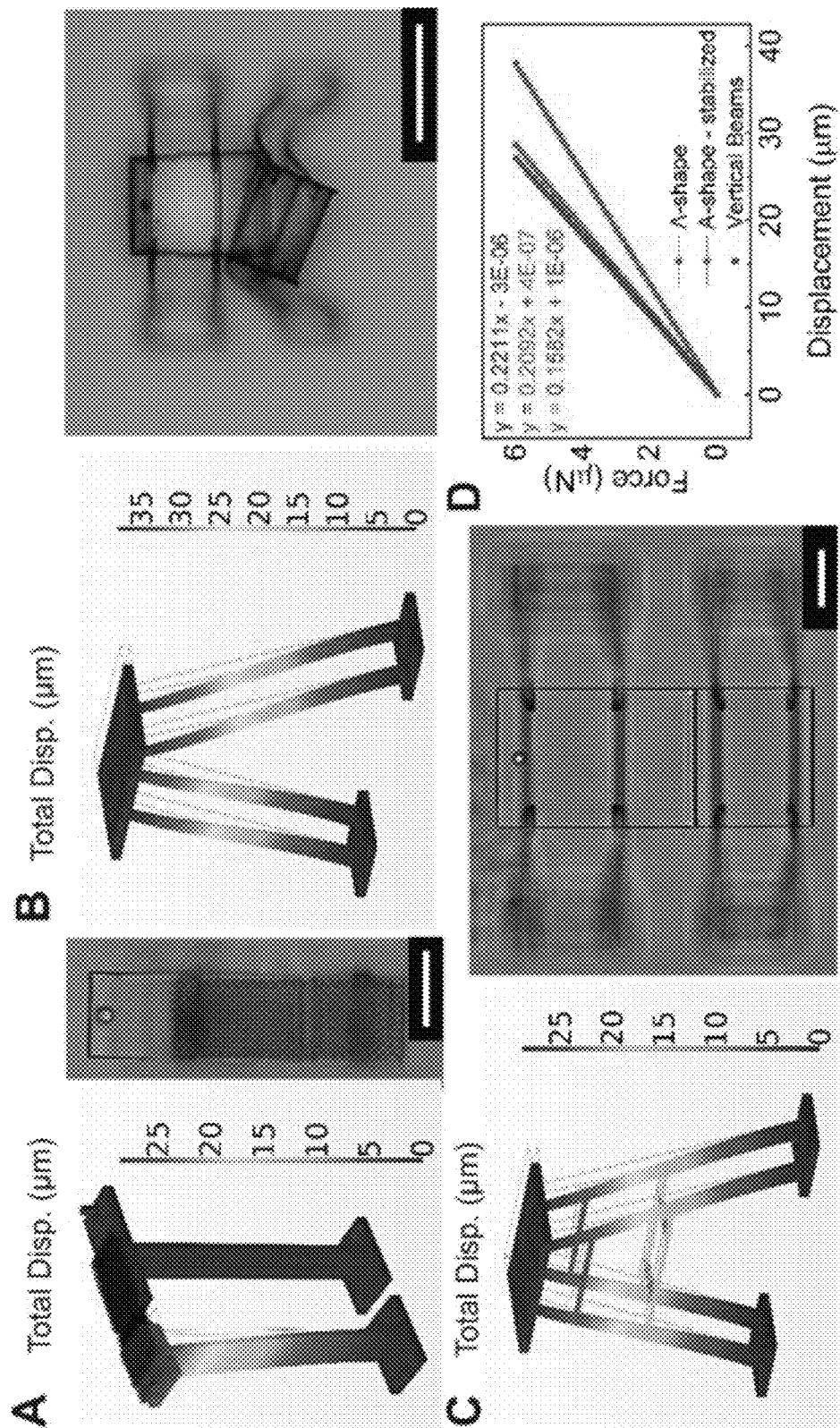
FIG. 8 is a design, simulation, and fabrication of the second generation of the single cell pair stretcher (vertical)

To fabricate the structures shown in FIG. 1, FIG. 7, and FIG. 8, microscale 3D printing based on TPP was used. CAD files in STL format exported from COMSOL 4.2 software were imported into the Describe software (Nanoscribe, GmbH) to compile job files for the Photonic Professional (GT) tool (Nanoscribe, GmbH). The slicing and hatching distances were selected to be 0.4 μm and 0.3 respectively. The vendor-supplied liquid photoresist, IP-S, and a 25× immersion microscope objective were used to print structures in the galvo-scanning mode using the so-called deep-in laser lithography (DiLL) optical arrangement.

Glass coverslips with diameters ranging from 11 to 25 mm and thicknesses of approximately 160 μm were used as substrates in the present study. Prior to 3D printing, the glass substrates were coated with indium tin oxide (ITO) to achieve optical reflectivity of the IP-S/substrate interface sufficient for autofocusing. The ITO layer had a thickness of approximately 50 nm and was deposited using direct current sputtering of an ITO target in an Ar plasma. It was found that mechanical 3D structures printed directly on ITO-coated glass had insufficient adhesion and would detach from the substrate after prolonged soaking or incubation in aqueous solutions. To address this commonly encountered issue of insufficient adhesion between smooth substrates and 3D structures fabricated using TPP, an in-house developed protocol was used in which an additional layer of porous silicon oxide (PSO) was deposited on top of ITO-coated coverslips. PSO with a thickness of approximately 2 μm and a high density of nanopores was found to act as an excellent anchoring layer, eliminating detachment of the 3D printed structures from the substrate during soaking and subsequent experiments in aqueous solutions. For all experiments, arrays of structures (varying from 5×4 up to 6×6) were fabricated on each coverslip, allowing for increased throughput in testing.

Structure Preparation for Fluorescence Imaging

The structures were placed inside of a glass-bottom petri dish, washed with 70% ethanol, and immediately soaked with PBS for 10 minutes until all the ethanol dissolved. The substrate was then submerged in 0.3% volume ratio Sudan Black B (Sigma-Aldrich) in 70% ethanol for one hour to eliminate the autofluorescence of the polymer. To dissolve excessive Sudan Black, the substrate was submerged in 70% ethanol for 1 hour and then soaked with PBS for 10 minutes. The substrate was then coated with fibronectin to enhance the adhesion and growth of the cells on the structures. Fibronectin solution with a concentration of 50 μg/ml in PBS was placed on the substrate and left in the incubator for 2 hours. Finally, the fibronectin solution was removed, and the substrate was washed with PBS two times.

Structure Preparation for Mechanical Characterization

The structures were placed inside of a glass-bottom petri dish, washed with 70% ethanol, and immediately soaked with PBS for 10 minutes until all the ethanol dissolved. The substrate was then coated with fibronectin (50 μg/ml in PBS) to enhance the adhesion and growth of the cells on the structures. The fibronectin solution was placed on the substrate and left in the incubator for 2 hours. The solution was removed, and the substrate was washed with PBS.

Cell Deposition

Figure 10:
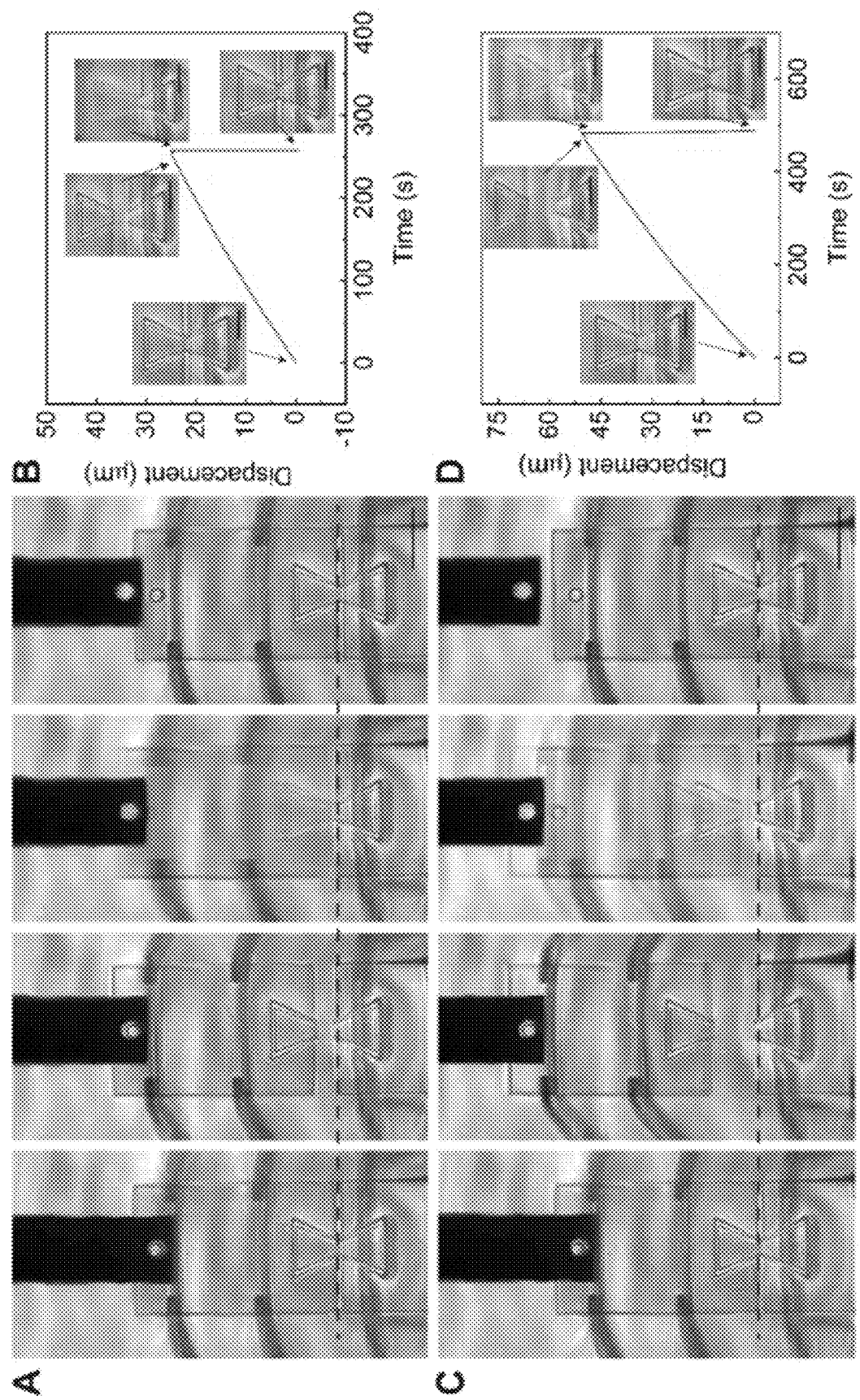
FIG. 10 illustrates elastic deformation of the structure.

An Eppendorf single-cell isolation setup was used to pick up and position cells on the stretching structure. This setup has a microcapillary (Piezo Drill Tip ICSI, Eppendorf) with a tip inner diameter of 6 The microcapillary is connected to a pressure controller (CellTram® 4r Air/Oil, Eppendorf) which can control the inside pressure of the pipette. The micropipette position is controlled with a 3D manipulator (TransferMan® 4r, Eppendorf) on an inverted microscope. First, the microcapillary is positioned just above a cell on the substrate and brought into contact with the cell membrane. Then, a negative pressure is applied, suctioning the cell onto the pipette tip. Finally, the cell is retracted from the surface and positioned on the structure and detached from the pipette tip by applying positive pressure. The same procedure is performed to pick up and position the second cell (FIG. 10).

Etched AFM Probe by Focused Ion Beam (FIB)

To apply displacement to the structure, AFM probes were used. For this purpose, the AFM probe was drilled using FIB etching to make a circular hole with a diameter of 15 µm so that it could capture the pillar (10 µm diameter) on the structure.

Immunofluorescence and Microscopy

The A431 cells were E-cadherin GFP-tagged to visualize the cell-cell junctions. Alexa Fluor™ 657 Phalloidin (Invitrogen) was used to stain the actin filaments and the nuclei were stained with DAPI (Invitrogen). The structures with deposited cells were placed in a glass-bottom petri dish. The cells were washed twice with PBS, pH 7.4, and fixed using 4% formaldehyde solution in PBS for 15 minutes at room temperature, and then washed two times with PBS. Subsequently, they were permeabilized with a solution of 0.1% Triton X-100 in PBS for 15 minutes and then washed twice with PBS. To enhance the quality of the actin fluorescent intensity, 4 drops of Image-iT™ FX Signal Enhancer (Thermofisher) were added and incubated at room temperature with a humid environment for 30 minutes. After removing the solution and washing with PBS, the Phalloidin staining solution with a ratio of 1:100 in PBS was placed on the substrate for 30 minutes at room temperature and then washed with PBS. Next, the DAPI solution with a ratio of 1:1000 with PBS was placed on the substrate and incubated for 10 minutes at room temperature. The solution was removed, and the substrate was washed with PBS. Finally, 3 ml of pure water was added to the petri dish for imaging.

Zyxin staining was performed to visualize the focal adhesion points between cells and the structure. After fixing the cells (see above), the anti-zyxin antibody (Sigma) with a ratio of 1:250 with PBS was added to the sample and refrigerated for 24 hours. The solution was then removed, and the sample was washed with PBS. PBS was replaced by Goat anti-Rabbit IgG (H+L), Superclonal™ Recombinant Secondary Antibody, Alexa Fluor 647 (Thermofisher) and incubated for 1 hour at 37° C. Finally, the sample was washed with PBS and the actin and nuclei staining protocol were performed. Pharmacological treatments modulating cell contractility included 3 µM blebbistatin (Bleb) (Sigma-Aldrich) for 2 h and 1 unit/ml Rho Activator I (CN01; Cytoskeleton, Inc., Denver, CO) for 30 min.

A Nikon A1-NiE upright confocal system (60× water immersion objective) driven by NIS-Elements Confocal image acquisition and analysis program (Nikon software) was used for immunofluorescent imaging of cells on the structures. All image reconstructions and channel alignments were performed within the Nikon software. Zeiss Axio 7 was used for the stretch test. An AFM setup (Nanosurf AG, Switzerland) was installed on the microscope to apply the displacement to the structures.

Cell Lysis, Gel Electrophoresis, and Immunoblotting

A431 GFP-tagged E-cadherin cells were lysed with RIPA buffer (50 mM Tris-HCl, pH 7.4, 150 mM NaCl, 5 mM EDTA, 2 mM dithiothreitol, 1 mM PMSF and 1% Triton X-100) containing a protease inhibitor cocktail (S8830; Sigma). Whole-cell lysates were incubated on ice for 30 min and then centrifuged at 14000 g for 20 min at 4° C. Proteins were separated by SDS-PAGE using 8% gels and blotted onto PVDF (polyvinylidene fluoride) membranes. The blots were incubated overnight at 4° C. with anti-E-cadherin (BD Biosciences; 610181), or anti-β-Actin (Santa Cruz Biotechnology; SC-47778). Blots were then washed and incubated with HRP-conjugated anti-mouse (Jackson immunoresearch), followed by washing and detection of immunoreactivity with enhanced chemiluminescence (Santa Cruz Biotechnology).

Displacement Tracking Using DIC

A modified version of MATLAB digital image correlation (DIC) was used to analyze the frames from the stretch test. The first frame was considered as the reference and the rest of the frames were compared to the reference frame to calculate the displacement of each island. A region of interest with markers within the region was defined for both islands. Then, the MATLAB code calculated the markers' new coordinates with respect to the first frame, from which the displacement of the islands was calculated. The force is defined by the Island 1 displacement multiplied by its stiffness, and the stress is acquired by dividing the force by the junction cross-section (approximately 120 µm$^2$). The strain is then calculated as the difference between the islands' displacements divided by the cell-cell junction's initial length (approximately 20 µm).

Design and Simulation of the Single Cell Stretcher Structure

Several generations of the sensing beam structure have been designed, fabricated, and tested, and their stiffness was calculated using COMSOL Multiphysics simulation software. The first generation was a group of parallel horizontal beams. A design with 5 sets of beams was proposed as the first design. After the simulation, the calculated stiffness was K=1e$^5$ N/m, which, compared to biological samples, was too large to measure the stress in the cell-cell junction (FIG. 7A). By reducing the number of beams, decreasing the beam width from 5 µm to 2.5 and increasing the beam length from 80 µm to 150 the stiffness was decreased to 4.6 N/m (FIG. 7B). However, this was still too large to measure stress. Since the maximum printing dimensions of the 3D printer device were reached, the length could not be increased, and due to the structure stability, the width of the beams could not be. A serpentine beam was then proposed to further decrease the stiffness with these geometric constraints in mind. This design further reduced the stiffness of the structure (K=1.05 N/m) but was still too stiff. (FIG. 7C). The force-displacement curves of these designs are compared in FIG. 7D. It is worth mentioning that these stiffness data are all calculated in air.

All of the horizontal beam designs have a stiffness higher than desired values (0.01 N/m-0.5 N/m). So, a vertical beam design was proposed (FIG. 8A). The vertical beam with a height of 280 µm was able to give a stiffness close to a goal (0.22 N/m). However, the beams being exactly underneath the islands creates high-intensity background noise during fluorescent imaging, blocking the signal from cells. Therefore, a double cantilever beam design was utilized by moving the beams' bases to the sides of the islands (Λ-shape). Theoretically, this change resulted in increasing the stiffness, so the design was modified by decreasing the beam thickness from 5 µm to 2.5 µm and increasing its height to 300 μm. With COMSOL simulation, its stiffness is lower than the other beam geometry designs (0.08 N/m); however, it collapsed during fabrication (not shown in the figures). Adding another set of Λ-shape beams (double Λ-shape) to increase stability still resulted in the collapse of the structures (FIG. 8B). Finally, a set of trusses were added horizontally to connect the vertical beams and enhance stability (stabilized Λ-shape), resulting in stable structures with the stiffness of 0.11 N/m. (FIG. 8C). It is worth mentioning that these stiffness data are all calculated in air.

Beam Stiffness Calculation and Calibration

The modulus of elasticity of the printed material varies with laser power and print speed during TPP fabrication. The modulus of elasticity is very important since it affects the stiffness of the structure which is further used to calculate the force and stress. First, a deflection equation was derived for the actuating beam using beam theory for a fixed and guided beam to find the relation between the applied force and the displacement. Then, data from AFM force spectroscopy experiments on the structure were averaged and used to find the actuating beam stiffness. Finally, from the AFM data and the theoretical model, the sensing beam stiffness is obtained.

Figure 9:
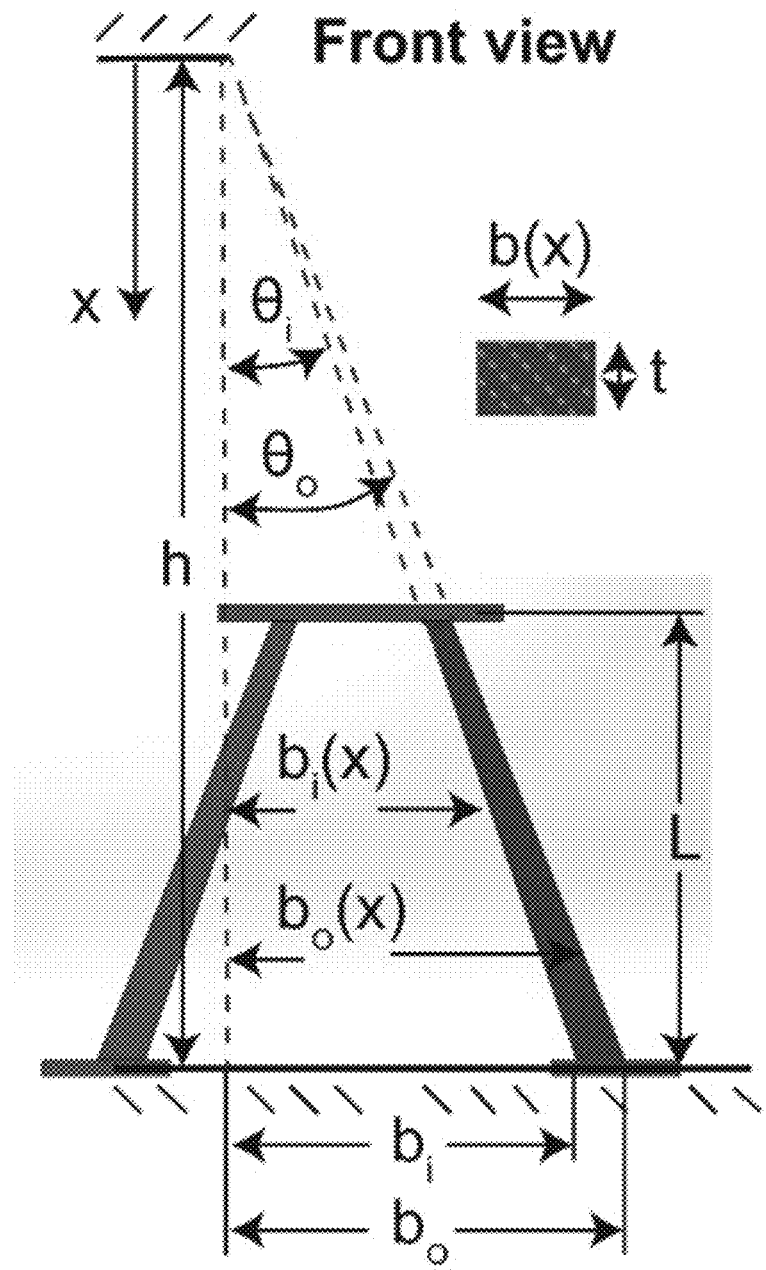
FIG. 9 illustrates geometric definitions of the beam used to derive the theoretical model; h is the height of the point where the tapered beam meets into a point; L is the height of the structure; the beam width, b(x), is determined from the difference of the inner and outer base width, $b_i(x)$ and $b_o(x)$, respectively, which are found from the distance from the point, x, and the inner and outer angles, $\theta_i$ and $\theta_o$; t is the thickness of the beams.

The actuating side of the microstructure is composed of four main beams, two cross beams, and a top plate. The force is assumed to be evenly distributed to every beam. Further, building on this assumption, it was assumed that each beam would deflect the same. Next, because of the crossbar and the coupling it provides on each beam, the torque that could be attributed to the applied force and the horizontal distance from the base to the top of the beam was neglected. Lastly, the top plate maintained that the end of each beam remained parallel, therefore the system was treated as a fixed and guided beam. For the structure, the beam thickness is consistent, but its cross-section varies (FIG. 9). The cross-section length of the beam can be defined as:

$$b(x) = b_o(x) - b_i(x) \quad (5)$$

where $b_o(x)$ and $b_i(x)$ are the length of the outer and inner construction triangles, respectively. The moment of inertia of the beam, $I(x)$, can be expressed as:

$$I(x) = 4 * \left(\frac{1}{12} b(x) t^3\right) = \frac{1}{3} b(x) t^3 \quad (6)$$

Here, four is the number of beams. Using the basic differential equations of the deflection curve of the beam, the deflection of the beam, $\delta_{act.}$, is derived:

$$-\delta_{act.} = \quad (7)$$
$$v(x) = \frac{w}{E}\left[\frac{1}{2} P x^2 - Pz \cdot (x \ln(x) - x) - M_B \cdot (x \ln(x) - x) + C_1 x + C_2\right]$$

Here, P is the applied force, $M_B$ is the moment produced by the top plate on the end of the beam, E is the modulus of elasticity, w is a constant equal to $$w = \frac{3h}{(b_o - b_i)t^3},$$

z is a structural constant equal to $z = h-L$, and $C_1$ and $C_2$ are the integration constants that come from the boundary conditions for a fixed guided beam:

$$C_1 = Pz \cdot \ln(h) + M_B \ln(h) - Ph \quad (8)$$

$$C_2 = Pz \cdot h(\ln(h)+1) + M_B \cdot h(\ln(h)+1) - \tfrac{1}{2} Ph^2 - C_1 h \quad (9)$$

Finally, the stiffness of the structure can be predicted for a given applied force, and the structural constants by the following equation:

$$k_{act.,theory} = \frac{P}{\delta_{act.}} \quad (10)$$

As mentioned in the paper, a tipless cantilever probe with a known and thermally tuned stiffness, $k_p$, was used to press on the actuating structure (FIG. 1E). AFM uses the deflection of the probe, $\Delta x_p$, and its known stiffness, $k_p$, to calculate the applied force, $P_{AFM}$. The microstructure is also subjected to the same force as it produces a reaction force which causes deflection:

$$P_{AFM} = \Delta x_p \cdot k_p = \Delta x_{act.} \cdot k_{act.} \quad (11)$$

As a result:

$$k_{act.} = \frac{P_{AFM}}{\Delta x_{act.}} = \frac{1}{d/P_{AFM} - 1/k_p} \quad (12)$$

where:

$$\Delta x_{act.} = d - \Delta x_p = d - \frac{P_{AFM}}{k_p} \quad (13)$$

Equation (7) shows that the stiffness is proportional to the cubic thickness, that is:

$$k_{act.} \propto t^3 \quad (14)$$

Therefore, $$k_{sens.} = k_{act.} \cdot \frac{t_{sens.}^3}{t_{act.}^3} \quad (15)$$

FIG. 1F shows the real experiment and the averaged data from AFM experiments. Analyzing the averaged curve together with equation (15) result in ($t_{act}$=6 μm):

$$k_{sensing}(t = 2.5 \text{ μm}) = 0.162 \frac{N}{m}$$

For the higher resolution experiments, the sensing structure with 2 μm beam thickness was used. The stiffness of this structure will be:

$$k_{sensing}(t = 2 \text{ μm}) = 0.0827 \frac{N}{m}$$

Elastic Deformation of the Structure

Since the material used for the structure is a polymer, it is possible that viscoelastic effects during the deformation of the structure may result in a nonlinear, rate-dependent relationship between beam deflection and junction stress. To examine the elasticity of the structure, two experiments were performed with a controlled displacement and release. The first one was a 25 µm displacement and sudden release of the structure and the second one was a 50 µm displacement and sudden release. Since lower strain rates have more impact on the viscoelastic properties of the material, 100 nm/s (0.5% s$^{-1}$) was used for both experiments. FIG. 10 shows the displacement-time plots for the experiments. For the 25 µm displacement, 0.135 seconds after release, and for the 50 µm displacement, after 4.72 seconds, both return to the original position within the resolving power of the DIC, thus ruling out major plastic deformation. Further, the rapid release and return of the 25 µm test demonstrate that the viscoelastic effect can be negligible with this displacement, slightly less so with the 50 µm test. In the cell stretch experiments, the displacement of the sensing island is within 5 µm, in which elastic deformation dominates according to this experiment.

Cell Deposition Procedure

Cell manipulation was performed using the Eppendorf cell isolation system. This setup consists of a microcapillary (Piezo Drill Tip ICSI, Eppendorf) integrated with a pressure controller (CellTram® 4r Air/Oil, Eppendorf) and a 3D manipulator (TransferMan® 4r, Eppendorf), allowing for precise 3D cell manipulation. The inner diameter of the microcapillary was chosen based on the cell diameter (approximately 15 µm). To aspirate and hold a cell on the needle tip, the inner diameter should be less than the cell diameter. Based on available needle sizes from Eppendorf, Piezo Drill Tip ICSI with 6 µm inner diameter was selected. The needle is connected to the capillary and through a tube to the pressure controller. The tube is filled with mineral oil, and a small displacement of the pressure controller cylinder creates positive or negative pressure at the needle tip.

The needle approaches the cell using the 3D manipulator (FIG. 11A). When it touches the cell membrane, a negative pressure is applied to aspirate the cell (FIG. 11B). While the cell is held at the needle tip, it is positioned above Island 1, and a positive pressure is applied to detach the cell from the needle and place it on the surface (FIG. 11C). The same procedures are performed to place the second cell on Island 2 (FIGS. 11D-F). This process is performed inside a temperature-controlled chamber.

Stress-Strain Curve Calculation

Each stretch test was recorded with a screen recorder software (Camtasia) and the movie was divided into frames that were analyzed with a customized DIC-based program to calculate each island's movement. In this method, a region of interest is defined and, within this region, a few markers are placed. The higher the number of markers, the better the resolution of the calculated displacement is. Then, when the coordinates of these markers change, a corresponding red marker appears (FIGS. 12A and 12B). In the first frame, both initial and displaced positions of markers are completely overlapped so just red markers are shown. As the frames continue, the red markers move with the island movement. This method can find changes in the markers' coordinates for each frame and calculate their displacement by comparing their new coordinates to their initial coordinates in the first frame. The output will be a matrix of markers' coordinates for each frame. Then, the displacement of each island is obtained by averaging the displacement of markers in the ROI in each frame. The strain is calculated by dividing the difference of both islands' displacements by the initial length $$\left(\varepsilon = \frac{D - \delta}{L_0}\right).$$

It is assumed that a pair of cells that have a junction in between are attached fully to the substrate and when the force is applied, deformation occurs to half of each cell where cell-ECM adhesion, Therefore, the initial length, $L_0$, is approximately the distance between the two cells' nuclei, which is measured to be approximately 20 µm. D is the forcing island displacement, δ is the sensing island displacement, $L_0$ is the initial length (FIG. 12C). Force is calculated using Hooke's Law, F=kδ, where k is the sensing island stiffness obtained from both the simulation verified by the AFM experiment Stress is defined by dividing the force by the cross-section area. The cross-section area is the junction length multiplied by its depth. The junction length is measured to be approximately 16 µm and the depth is measured to be approximately 10 µm. Strain rate is defined by the displacement rate divided by the initial length (20 µm). After these calculations, a stress-strain curve can be plotted.

CN01, Control DMSO, and Bleb Stretch Test Frames

Figure 13:
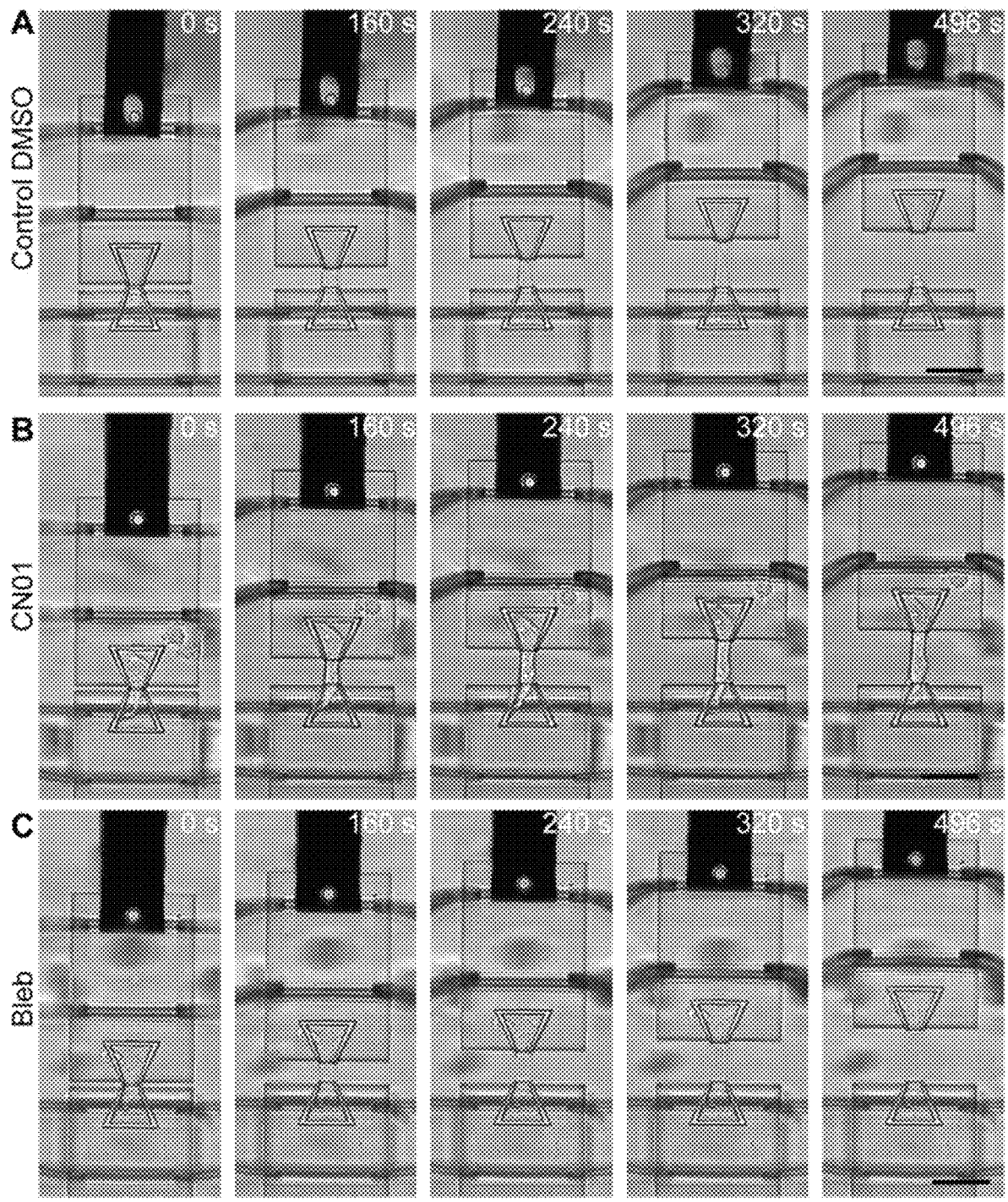
FIG. 13 is a series of frames for CN01, control, and bleb under 0.5% $s^1$ strain rate stretch test.

Investigation of cellular contractility was performed using CN01, control DMSO, and Bleb with a 0.5% s$^{-1}$ (100 nm/s) strain rate, and representative frames are shown in FIG. 13. CN01 increased the stress level and rupture did not occur at this test (FIG. 13B). Control DMSO compared to control at 0.5% s$^{-1}$ showed a sign of rupture because of DMSO (FIG. 13A). Since Bleb inhibits myosin II pathway, the cell-cell adhesion junction ruptured at the initial stages and stress level was low compared to other conditions (FIG. 13C).

Cell-Cell Adhesion Junction Length Calculation

Figure 14:
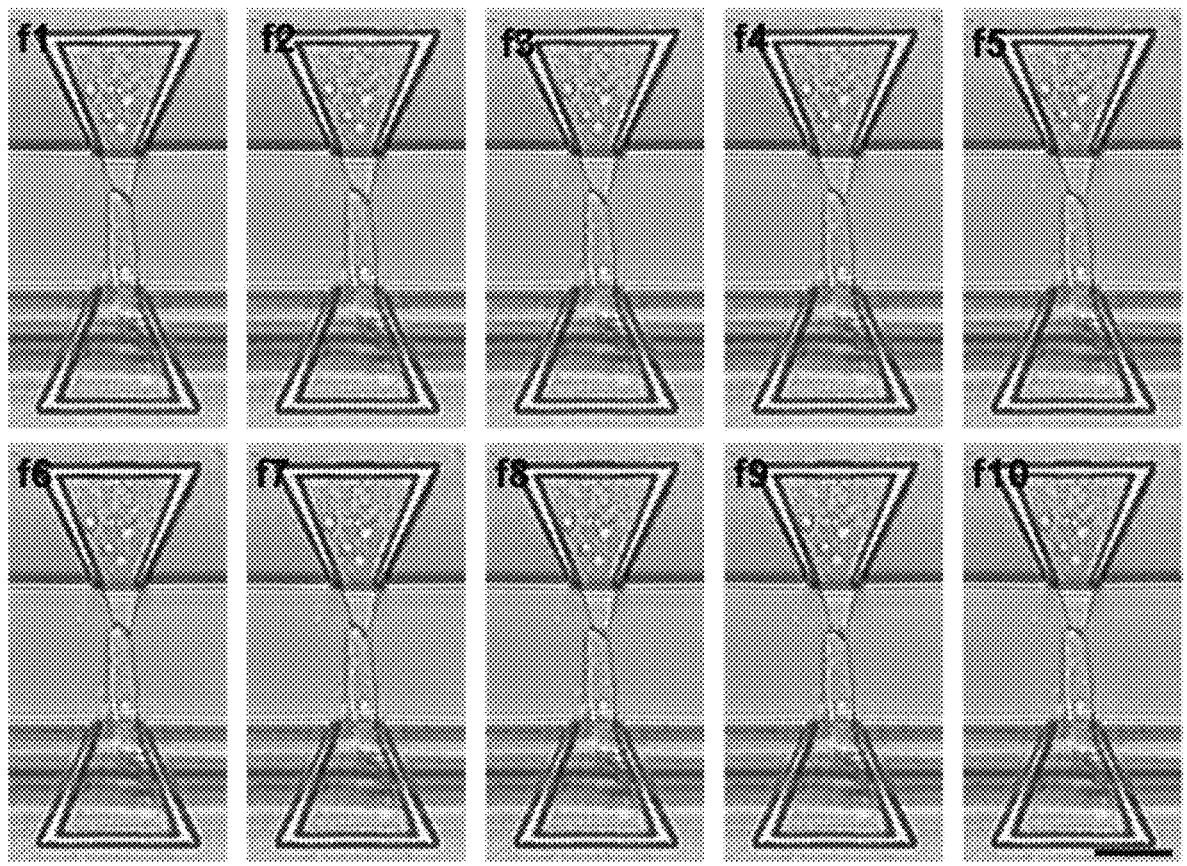
FIG. 14 is a cell-cell adhesion junction length calculation; the cell-cell adhesion junction lengths were calculated using ImageJ software; after defining the scale for each frame, a freehand line was drawn on the junction and its length was captured (f1 to f10); scale bar: 25 μm.

To calculate the junction length, ImageJ (NIH funded software) was used. The scale is assigned to the frames of interest and a freehand line was drawn on the junction (FIG. 14). By analyzing these lines through the software, each length can be measured and tabulated (Table 51).

TABLE S1

Figure 12:
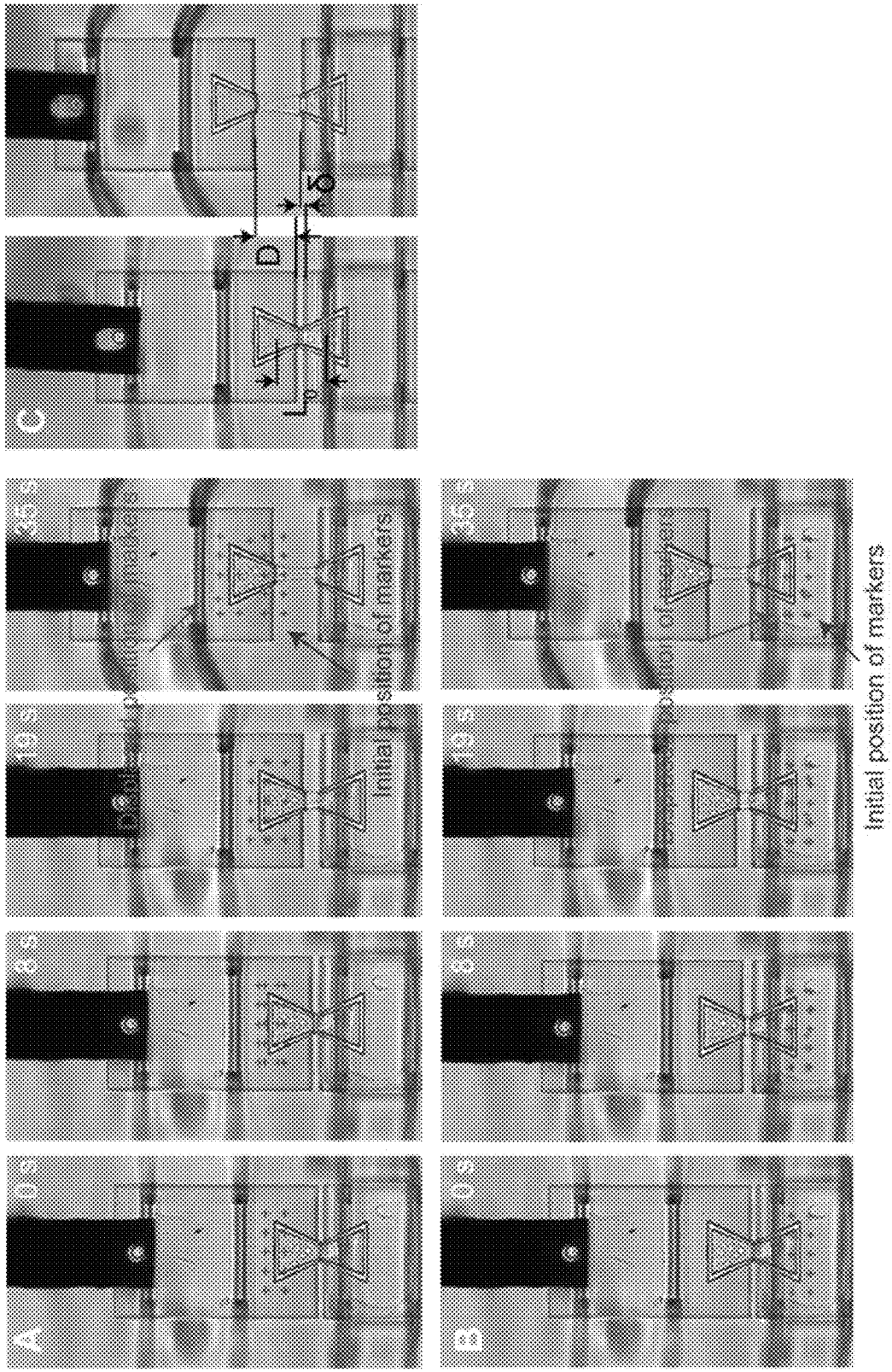
FIG. 12 illustrates a stress-strain calculation.

The corresponding junction lengths to FIG. 12 frames.

| Frame # | Junction length (µm) | Frame # | Junction length (µm) |
|---|---|---|---|
| 1 | 8.019 | 6 | 6.698 |
| 2 | 7.889 | 7 | 6.121 |
| 3 | 7.931 | 8 | 5.789 |
| 4 | 7.673 | 9 | 5.513 |
| 5 | 7.043 | 10 | 5.147 |

E-Cadherin siRNA Knockdown

To determine the E-cadherin bond effect on the stress-strain curve and bond rupture initiation, E-cadherin siRNA was transfected into A431 GFP-tagged E-cadherin cells. Cells were incubated with E-cadherin siRNA and Lipofectamine RNAiMAX, and with control siRNA and Lipofectamine RNAiMAX as the control sample for 48 h, 72 h, and 96 h. The inhibition in the expression of the E-cadherin protein was confirmed by fluorescence microscopy and immunoblotting. After 48 h, a specific knockdown of E-cadherin expression was visualized by fluorescence microscopy. Immunoblotting shows that the protein levels of E-cadherin were dramatically decreased in A431 GFP-tagged E-cadherin cells compared to control siRNA. These results demonstrate that E-cadherin siRNA can downregulate the E-cadherin expression effectively Each of the following references is incorporated by reference in its entirety for all purposes:

1 Rodriguez-Boulan, E. & Macara, I. G. Organization and execution of the epithelial polarity programme. Nature reviews. *Molecular cell biology* 15, 225-242, (2014).
2 Kadohama, T., Nishimura, K., Hoshino, Y., Sasajima, T. & Sumpio, B. E. Effects of different types of fluid shear stress on endothelial cell proliferation and survival. *J. Cell. Physiol.* 212, 244-251, (2007).
3 Haidekker, M. A., White, C. R. & Frangos, J. A. Analysis of temporal shear stress gradients during the onset phase of flow over a backward-facing step. *J. Biomech. Eng.* 123, 455-463, (2001).
4 Jiang, G. L., White, C. R., Steven, H. Y., Inzunza, M. R. & Frangos, J. A. Temporal gradients in shear, but not ramp flow, stimulate the proliferation of osteoblast-like cells. *J. Bone Miner. Res.* 16, S494-S494, (2001).
5 Cai, D. et al. Mechanical feedback through E-cadherin promotes direction sensing during collective cell migration. *Cell* 157, 1146-1159, (2014).
6 Zhang, L., Feng, X. Q. & Li, S. F. Review and perspective on soft matter modeling in cellular mechanobiology: cell contact, adhesion, mechanosensing, and motility. *Acta Mechanica* 228, 4095-4122, (2017).
7 Park, J. S. et al. Differential effects of equiaxial and uniaxial strain on mesenchymal stem cells. *Biotechnol. Bioeng.* 88, 359-368, (2004).
8 Chiquet, M., Tunc-Civelek, V. & Sarasa-Renedo, A. Gene regulation by mechanotransduction in fibroblasts. *Appl. Physiol. Nutr. Metab.* 32, 967-973, (2007).
9 Gumbiner, B. M. Regulation of cadherin-mediated adhesion in morphogenesis. *Nat. Rev. Mol. Cell Biol.* 6, 622-634, (2005).
10 Niessen, C. M., Leckband, D. & Yap, A. S. Tissue organization by cadherin adhesion molecules: dynamic molecular and cellular mechanisms of morphogenetic regulation. *Physiol. Rev.* 91, 691-731, (2011).
11 Tepass, U., Truong, K., Godt, D., Ikura, M. & Peifer, M. Cadherins in embryonic and neural morphogenesis. *Nat. Rev. Mol. Cell Biol.* 1, 91-100, (2000).
12 Ding, L. et al. Genome remodelling in a basal-like breast cancer metastasis and xenograft. *Nature* 464, 999-1005, (2010).
13 Najor, N. A. Desmosomes in Human Disease. *Annu. Rev. Pathol.* 13, 51-70, (2018).
14 Bierkamp, C., McLaughlin, K. J., Schwarz, H., Huber, O. & Kemler, R. Embryonic heart and skin defects in mice lacking plakoglobin. *Dev. Biol.* 180, 780-785, (1996).
15 Sundfeldt, K. Cell-cell adhesion in the normal ovary and ovarian tumors of epithelial origin; an exception to the rule. *Mol. Cell. Endocrinol.* 202, 89-96, (2003).
16 Lozano, E., Betson, M. & Braga, V. M. Tumor progression: Small GTPases and loss of cell-cell adhesion. *BioEssays* 25, 452-463, (2003).
17 Maiti, R. et al. In vivo measurement of skin surface strain and sub-surface layer deformation induced by natural tissue stretching. *J Mech Behav Biomed Mater* 62, 556-569, (2016).
18 Padala, M. et al. Mechanics of the mitral valve strut chordae insertion region. *J. Biomech. Eng.* 132, 081004, (2010).
19 He, Z., Ritchie, J Grashow, J. S., Sacks, M. S. & Yoganathan, A. P. In vitro dynamic strain behavior of the mitral valve posterior leaflet. *J Biomech. Eng.* 127, 504-511, (2005).
20 Perlman, C. E. & Bhattacharya, J. Alveolar expansion imaged by optical sectioning microscopy. *J Appl Physiol* (1985) 103, 1037-1044, (2007).
21 Monemian Esfahani, A. et al. Tissue Regeneration from Mechanical Stretching of Cell-Cell Adhesion. *Tissue Eng Part C Methods*, (2019).
22 Charras, G. & Yap, A. S. Tensile Forces and Mechanotransduction at Cell-Cell Junctions. *Curr. Biol.* 28, R445-R457, (2018).
23 Singh Vishen, A., Rupprecht, J. F., Shivashankar, G. V., Prost, J. & Rao, M. Soft inclusion in a confined fluctuating active gel. *Phys Rev E* 97, 032602, (2018).
24 Khalilgharibi, N., Fouchard, J., Recho, P., Charras, G. & Kabla, A. The dynamic mechanical properties of cellularised aggregates. *Curr. Opin. Cell Biol.* 42, 113-120, (2016).
25 Liang, X., Michael, M. & Gomez, G. A. Measurement of Mechanical Tension at Cell-cell Junctions Using Two-photon Laser Ablation. Bio protocol 6, e2068, (2016).
26 Tambe, D. T. et al. Collective cell guidance by cooperative intercellular forces. *Nat. Mater.* 10, 469-475, (2011).
27 Jodoin, J. N. et al. Stable Force Balance between Epithelial Cells Arises from F-Actin Turnover. *Dev. Cell* 35, 685-697, (2015).
28 Khalilgharibi, N. et al. Stress relaxation in epithelial monolayers is controlled by the actomyosin cortex. *Nat. Phys.* 15, 839-847, (2019).
29 Bertocchi, C. et al. Nanoscale architecture of cadherin-based cell adhesions. *Nat. Cell Biol.* 19, 28-37, (2017).
30 Bays, J. L. et al. Vinculin phosphorylation differentially regulates mechanotransduction at cell-cell and cell-matrix adhesions. *J. Cell Biol.* 205, 251-263, (2014).
31 Bays, J. L., Campbell, H. K., Heidema, C., Sebbagh, M. & DeMali, K. A. Linking E-cadherin mechanotransduction to cell metabolism through force-mediated activation of AMPK. *Nat. Cell Biol.* 19, 724-731, (2017).
32 Kametani, Y. & Takeichi, M. Basal-to-apical cadherin flow at cell junctions. *Nat. Cell Biol.* 9, 92-98, (2007).
33 Priya, R., Yap, A. S. & Gomez, G. A. E-cadherin supports steady-state Rho signaling at the epithelial zonula adherens. Differentiation 86, 133-140, (2013).
34 Bois, J. S., Julicher, F. & Grill, S. W. Pattern formation in active fluids. *Phys. Rev. Lett.* 106, 028103, (2011).
35 Priya, R. et al. Bistable front dynamics in a contractile medium: Travelling wave fronts and cortical advection define stable zones of RhoA signaling at epithelial adherens junctions. *PLoS Comput. Biol.* 13, (2017).
36 Jurado, J., de Navascues, J. & Gorfinkiel, N. alpha-Catenin stabilises Cadherin-Catenin complexes and modulates actomyosin dynamics to allow pulsatile apical contraction. *J. Cell Sci.* 129, 4496-4508, (2016).
37 Buckley, C. D. et al. Cell adhesion. The minimal cadherin-catenin complex binds to actin filaments under force. Science 346, 1254211, (2014).
38 Manibog, K., Li, H., Rakshit, S. & Sivasankar, S. Resolving the molecular mechanism of cadherin catch bond formation. *Nature Communications* 5, (2014).
39 Huang, D. L., Bax, N. A., Buckley, C. D., Weis, W. I. & Dunn, A. R. Vinculin forms a directionally asymmetric catch bond with F-actin. *Science* 357, 703-706, (2017).

40 Rakshit, S., Zhang, Y. X., Manibog, K., Shafraz, O. & Sivasankar, S. Ideal, catch, and slip bonds in cadherin adhesion. *Proc. Natl. Acad. Sci. U S. A.* 109, 18815-18820, (2012).

41 Ahmadzadeh, H., Smith, D. H. & Shenoy, V. B. Viscoelasticity of tau proteins leads to strain rate-dependent breaking of microtubules during axonal stretch injury: predictions from a mathematical model. *Biophys. J.* 106, 1123-1133, (2014).

42 Gardel, M. L., Kasza, K. E., Brangwynne, C. P., Liu, J. & Weitz, D. A. Chapter 19: Mechanical response of cytoskeletal networks. *Methods Cell Biol.* 89, 487-519, (2008).

43 Hu, J. et al. Size- and speed-dependent mechanical behavior in living mammalian cytoplasm. *Proc. Natl. Acad. Sci. U.S.A.* 114, 9529-9534, (2017).

44 Casares, L. et al. Hydraulic fracture during epithelial stretching. *Nat. Mater.* 14, 343-351, (2015).

45 Harris, A. R. et al. Characterizing the mechanics of cultured cell monolayers. *Proc. Natl. Acad. Sci. U S. A.* 109, 16449-16454, (2012).

46 Trepat, X. et al. Effect of stretch on structural integrity and micromechanics of human alveolar epithelial cell monolayers exposed to thrombin. *American Journal of Physiology-Lung Cellular and Molecular Physiology* 290, L1104-L1110, (2006).

47 Legant, W. R. et al. Multidimensional traction force microscopy reveals out-of-plane rotational moments about focal adhesions. *P Natl Acad Sci USA* 110, 881-886, (2013).

48 Liu, Z. J. et al. Mechanical tugging force regulates the size of cell-cell junctions. *Proc. Natl. Acad. Sci. U.S.A.* 107, 9944-9949, (2010).

49 Klein, F. et al. Two-component polymer scaffolds for controlled three-dimensional cell culture. *Adv Mater* 23, 1341-1345, (2011).

50 Klein, F. et al. Elastic Fully Three-dimensional Microstructure Scaffolds for Cell Force Measurements. *Advanced Materials* 22, 868-+, (2010).

51 Chu, Y. S. et al. Force measurements in E-cadherin-mediated cell doublets reveal rapid adhesion strengthened by actin cytoskeleton remodeling through Rac and Cdc42. *J. Cell Biol.* 167, 1183-1194, (2004).

52 Cumpston, B. H. et al. Two-photon polymerization initiators for three-dimensional optical data storage and microfabrication. *Nature* 398, 51-54, (1999).

53 Yang, R., Broussard, J. A., Green, K. J. & Espinosa, H. D. Techniques to stimulate and interrogate cell-cell adhesion mechanics. *Extreme Mech Lett* 20, 125-139, (2018).

54 Broussard, J. A. et al. The desmoplakin/intermediate filament linkage regulates cell mechanics. *Mol. Biol. Cell*, mbc. $E_{16}$-07-0520, (2017).

55 Liu, Z. et al. Mechanical tugging force regulates the size of cell-cell junctions. *Proc. Natl. Acad. Sci. U.S.A.* 107, 9944-9949, (2010).

56 Frohlich, J. & Konig, H. New techniques for isolation of single prokaryotic cells. *FEMS Microbiol. Rev.* 24, 567-572, (2000).

57 Slomka, N., Oomens, C. W. & Gefen, A. Evaluating the effective shear modulus of the cytoplasm in cultured myoblasts subjected to compression using an inverse finite element method. *Journal of the mechanical behavior of biomedical materials* 4, 1559-1566, (2011).

58 Waugh, R. & Tsai, M. in *Cell Mechanics and Cellular Engineering* 33-44 (Springer, 1994).

59 Marion, S., Guillen, N., Bacri, J.-C. & Wilhelm, C. Acto-myosin cytoskeleton dependent viscosity and shear-thinning behavior of the amoeba cytoplasm. *Eur. Biophys. J.* 34, 262-272, (2005).

60 Panorchan, P. et al. Single-molecule analysis of cadherin-mediated cell-cell adhesion. *J. Cell Sci.* 119, 66-74, (2006).

61 Thomas, W. E. Understanding the counterintuitive phenomenon of catch bonds. *Current Nanoscience* 3, 63-77, (2007).

62 Panorchan, P., George, J. P. & Wirtz, D. Probing intercellular interactions between vascular endothelial cadherin pairs at single-molecule resolution and in living cells. *J. Mol. Biol.* 358, 665-674, (2006).

63 Friedrichs, J. et al. A practical guide to quantify cell adhesion using single-cell force spectroscopy. *Methods* 60, 169-178, (2013).

64 Vedula, S. et al. Quantifying forces mediated by integral tight junction proteins in cell-cell adhesion. *Experimental mechanics* 49, 3-9, (2009).

65 Tabdili, H. et al. Cadherin-dependent mechanotransduction depends on ligand identity but not affinity. *J. Cell Sci.* 125, 4362-4371, (2012).

66 Kashef, J. & Franz, C. M. Quantitative methods for analyzing cell-cell adhesion in development. *Dev. Biol.* 401, 165-174, (2015).

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A method of measuring a stress-strain curve in a cell-cell adhesion interface, the method comprising:
   providing a structure including a first movable island supported by a first beam, a second movable island supported by a second beam, and a gap therebetween connected by a pair of cells forming a junction,
      the pair of cells comprising a cell-cell adhesion interface having an initial length defined by a distance between nuclei of the pair of cells;
   moving the second movable island with a defined displacement;
   determining a displacement of the first movable island based on moving the second movable island;
   calculating a difference between the displacement of the first movable island and the defined displacement of the second movable island based on moving the second movable island;
   determining an applied strain in the cell-cell adhesion interface between the pair of cells based on the difference divided by the initial length of the cell-cell adhesion interface;
   calculating a force between the cell-cell adhesion interface of the pair of cells based on the displacement of the first movable island;
   calculating a stress in the cell-cell adhesion interface between the pair of cells based on the force; and
   determining the stress-strain curve of the cell-cell adhesion interface between the pair of cells by plotting the calculated stress against the applied strain.

2. The method of claim 1, wherein moving the second movable island comprises moving the second movable island using atomic force microscopy (AFM).

3. The method of claim 1, wherein moving the second movable island comprises moving the second movable island using a nanopositioner.

4. The method of claim 1, wherein the pair of cells form the junction after culturing of the cells for a period of time.

5. The method of claim 1, wherein calculating a stress in the cell-cell adhesion interface comprises:
calculating the stress in the cell-cell adhesion interface based on dividing the applied force at the cell-cell adhesion interface by a cross-sectional area of the cell-cell adhesion interface.

6. The method of claim 1, wherein the structure is developed based on a nanofabricated polymeric structure using two-photon polymerization.

7. The method of claim 1, wherein each of the first beam has a first defined stiffness and the second beam has a second defined stiffness.

8. The method of claim 7, wherein at least one of the first defined stiffness or the second defined stiffness is measured by deforming the first beam or the second beam using an AFM probe having a known stiffness.

9. The method of claim 1, further comprising:
applying a stain to the pair of cells to visualize the cell-cell adhesion between the pair of cells and the focal adhesion points between each of the pair of cells and the structure.

10. The method of claim 1, wherein the structure further comprises a cell confinement structure,
wherein a first portion of the cell confinement structure is attached to the first movable island and a second portion of the cell confinement structure is attached to the second movable island, and
wherein each of the pair of cells is disposed within the first portion or the second portion of the cell confinement structure such that the pair of cells forms the junction between them to connect the two movable islands.

11. The method of claim 1, wherein moving the second movable island comprises:
moving the second movable island in a direction away from the first movable island.

12. The method of claim 1, wherein determining a displacement of the first movable island comprises:
determining a displacement of the first movable island using digital image correction (DIC).

13. The method of claim 1, wherein moving the second movable island with a defined displacement further comprises:
measuring the defined displacement using digital image correction (DIC).

14. An apparatus for performing a displacement-controlled tensile test of a pair of cells, the apparatus comprising:
a first movable island supported by a first supporting beam having a first defined stiffness; and
a second movable island supported by a second supporting beam having a second defined stiffness,
the first moveable island and the second moveable island defining a junction therebetween having an initial length, and
the first moveable island and the second moveable island being attached to an optically transparent substrate.

15. The apparatus of claim 14, further comprising a first cell confinement structure attached to the first moveable island and a second cell confinement structure attached to the second movable island.

16. The apparatus of claim 15, further comprising a pair of cells disposed within the first and second cell confinement structures.

17. The apparatus of claim 14, wherein the optically transparent substrate is optically coupled to an inverted microscope configured to monitor movement of the first moveable island and the second moveable island using digital image correlation (DIC).

18. The apparatus of claim 14, wherein the apparatus is configured to stretch the junction at a controlled strain rate by applying force to the second moveable island using a nanopositioner.

19. An apparatus for performing a displacement-controlled tensile test of a pair of cells, the apparatus comprising:
a first movable island supported by a first supporting beam having a first defined stiffness; and
a second movable island supported by a second supporting beam having a second defined stiffness,
wherein the first moveable island and the second moveable island define a junction therebetween having an initial length, and
wherein the apparatus is configured to stretch the junction at a controlled strain rate by applying force to the second moveable island using atomic force microscopy (AFM).

* * * * *

UNITED STATES PATENT AND TRADEMARK OFFICE
CERTIFICATE OF CORRECTION

| | |
|---|---|
| PATENT NO. | : 11,846,611 B2 |
| APPLICATION NO. | : 17/473090 |
| DATED | : December 19, 2023 |
| INVENTOR(S) | : Ruiguo Yang et al. |

It is certified that error appears in the above-identified patent and that said Letters Patent is hereby corrected as shown below:

On the Title Page

Please replace the following inventor's first name in the second Line of Item (72) Inventors:
"Nikolay" should be -- Nickolay --.

Signed and Sealed this
Nineteenth Day of March, 2024

Katherine Kelly Vidal
*Director of the United States Patent and Trademark Office*